(12) United States Patent
Sarrazin et al.

(10) Patent No.: US 10,475,000 B2
(45) Date of Patent: Nov. 12, 2019

(54) SYSTEMS AND METHODS FOR PROVIDING FILES IN RELATION TO A CALENDAR EVENT

(75) Inventors: Jacou Sarrazin, Repentigny (CA);
Marc Reddy Gingras, Cantley (CA);
Osman Currim, Richmond Hill (CA);
Eric Allan Fritzley, Guelph (CA)

(73) Assignee: BlackBerry Limited, Waterloo Ontario (CA)

( * ) Notice: Subject to any disclaimer, the term of this patent is extended or adjusted under 35 U.S.C. 154(b) by 717 days.

(21) Appl. No.: 14/397,380

(22) PCT Filed: Apr. 27, 2012

(86) PCT No.: PCT/CA2012/050268
§ 371 (c)(1),
(2), (4) Date: Oct. 27, 2014

(87) PCT Pub. No.: WO2013/159175
PCT Pub. Date: Oct. 31, 2013

(65) Prior Publication Data
US 2015/0081369 A1 Mar. 19, 2015

(51) Int. Cl.
*G06Q 10/10* (2012.01)
(52) U.S. Cl.
CPC ....... *G06Q 10/1093* (2013.01); *G06Q 10/107* (2013.01); *G06Q 10/109* (2013.01)
(58) Field of Classification Search
None
See application file for complete search history.

(56) References Cited

U.S. PATENT DOCUMENTS

| | | | | |
|---|---|---|---|---|
| 5,842,009 A * | 11/1998 | Borovoy | ............ | G06Q 10/109 |
| 6,085,205 A | 7/2000 | Peairs et al. | | |
| 7,003,735 B2 * | 2/2006 | Edlund | ............... | G06Q 10/109 |
| | | | | 715/708 |
| 7,472,135 B2 | 12/2008 | Huuskonen | | |
| 7,634,461 B2 * | 12/2009 | Oral | ....................... | G06F 16/93 |
| 7,774,718 B2 | 8/2010 | Finke-Anlauff et al. | | |
| 7,831,601 B2 * | 11/2010 | Oral | ...................... | G06F 16/338 |
| | | | | 707/741 |
| 7,912,901 B2 * | 3/2011 | Chakra | ................ | G06Q 10/109 |
| | | | | 709/204 |

(Continued)

FOREIGN PATENT DOCUMENTS

EP 2287755 2/2011

OTHER PUBLICATIONS

Office Action dated Sep. 5, 2017, received for European Patent Application No. 12875498.3.

(Continued)

*Primary Examiner* — Jeff Zimmerman
(74) *Attorney, Agent, or Firm* — Jeffrey N. Giunta; Fleit Gibbons Gutman Bongini & Bianco P.L.

(57) ABSTRACT

Systems and methods are provided for providing suggested files in relation to a calendar event. An electronic device receives an input related to the calendar event. Calendar event information, such as attendees, subject, and the date, are obtained. A search is performed for files related to the calendar event information. The related files can be ordered or ranked according to confidence values. The files are then displayed as suggestions. Links between suggested files and the calendar event are also formed.

15 Claims, 15 Drawing Sheets

(56) References Cited

U.S. PATENT DOCUMENTS

| | | | | |
|---|---|---|---|---|
| 7,970,753 B2* | 6/2011 | Oral | | G06F 16/93 |
| | | | | 707/711 |
| 8,335,801 B2* | 12/2012 | Gardner | | G06F 16/48 |
| | | | | 707/791 |
| 8,489,615 B2* | 7/2013 | Dhara | | H04L 12/1818 |
| | | | | 707/748 |
| 8,717,461 B2* | 5/2014 | Gallagher | | G06K 9/00677 |
| | | | | 348/231.5 |
| 8,832,205 B2* | 9/2014 | Nelson | | G06Q 10/109 |
| | | | | 709/203 |
| 8,868,566 B2* | 10/2014 | Yanagihara | | G06Q 10/107 |
| | | | | 707/748 |
| 8,868,567 B2* | 10/2014 | Kumar | | G06F 17/2785 |
| | | | | 707/748 |
| 8,897,434 B2* | 11/2014 | Perry | | H04M 3/56 |
| | | | | 379/202.01 |
| 8,909,749 B2* | 12/2014 | Branch | | G06F 9/4856 |
| | | | | 709/217 |
| 9,049,388 B2* | 6/2015 | Gallagher | | G06K 9/00677 |
| 9,760,803 B2* | 9/2017 | Kulick | | G06K 9/6267 |
| 2002/0140733 A1* | 10/2002 | Edlund | | G06Q 10/109 |
| | | | | 715/764 |
| 2003/0222765 A1* | 12/2003 | Curbow | | G06Q 10/109 |
| | | | | 340/309.7 |
| 2006/0031183 A1* | 2/2006 | Oral | | G06F 16/93 |
| 2006/0031197 A1* | 2/2006 | Oral | | G06F 16/338 |
| 2007/0008321 A1* | 1/2007 | Gallagher | | G06K 9/00677 |
| | | | | 345/473 |
| 2008/0040192 A1 | 2/2008 | Edlund et al. | | |
| 2008/0222170 A1 | 9/2008 | Farnham et al. | | |
| 2009/0037407 A1* | 2/2009 | Yang | | G06Q 10/107 |
| 2009/0077026 A1* | 3/2009 | Yanagihara | | G06Q 10/107 |
| 2010/0106727 A1* | 4/2010 | Oral | | G06F 16/93 |
| | | | | 707/741 |
| 2010/0150330 A1* | 6/2010 | Perry | | H04M 3/56 |
| | | | | 379/202.01 |
| 2010/0180200 A1 | 7/2010 | Donneau-Golencer | | |
| 2010/0245625 A1* | 9/2010 | Gallagher | | G06K 9/00677 |
| | | | | 348/231.5 |
| 2011/0106892 A1* | 5/2011 | Nelson | | G06Q 10/109 |
| | | | | 709/206 |
| 2011/0231409 A1* | 9/2011 | Dhara | | H04L 12/1818 |
| | | | | 707/748 |
| 2012/0023223 A1* | 1/2012 | Branch | | G06F 9/4856 |
| | | | | 709/224 |
| 2012/0096389 A1 | 4/2012 | Flam et al. | | |
| 2012/0158743 A1* | 6/2012 | Gardner | | G06F 16/48 |
| | | | | 707/748 |
| 2012/0173993 A1* | 7/2012 | Chakra | | G06Q 10/107 |
| | | | | 715/752 |
| 2012/0197905 A1* | 8/2012 | Kumar | | G06F 17/2785 |
| | | | | 707/748 |
| 2012/0209871 A1* | 8/2012 | Lai | | G06F 16/907 |
| | | | | 707/769 |
| 2013/0304924 A1* | 11/2013 | Dhara | | H04L 12/1818 |
| | | | | 709/226 |
| 2014/0160315 A1* | 6/2014 | Gallagher | | G06K 9/00677 |
| | | | | 348/231.5 |
| 2014/0181219 A1* | 6/2014 | Wang | | H04L 51/32 |
| | | | | 709/206 |

OTHER PUBLICATIONS

Summons to attend oral proceedings pursuant to Rule 115(1) EPC in European application No. 12875498.3 dated Jul. 19, 2019.

* cited by examiner

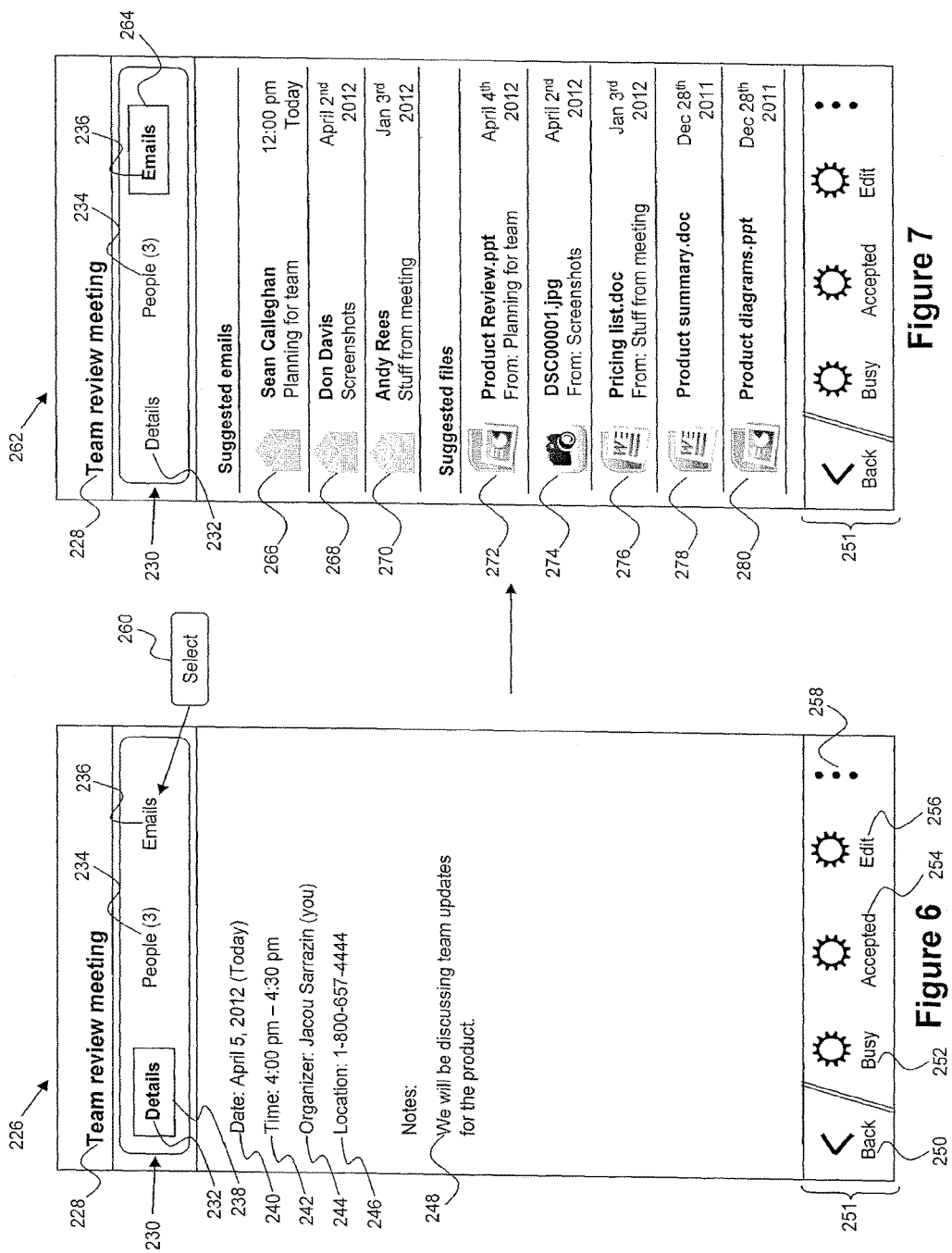

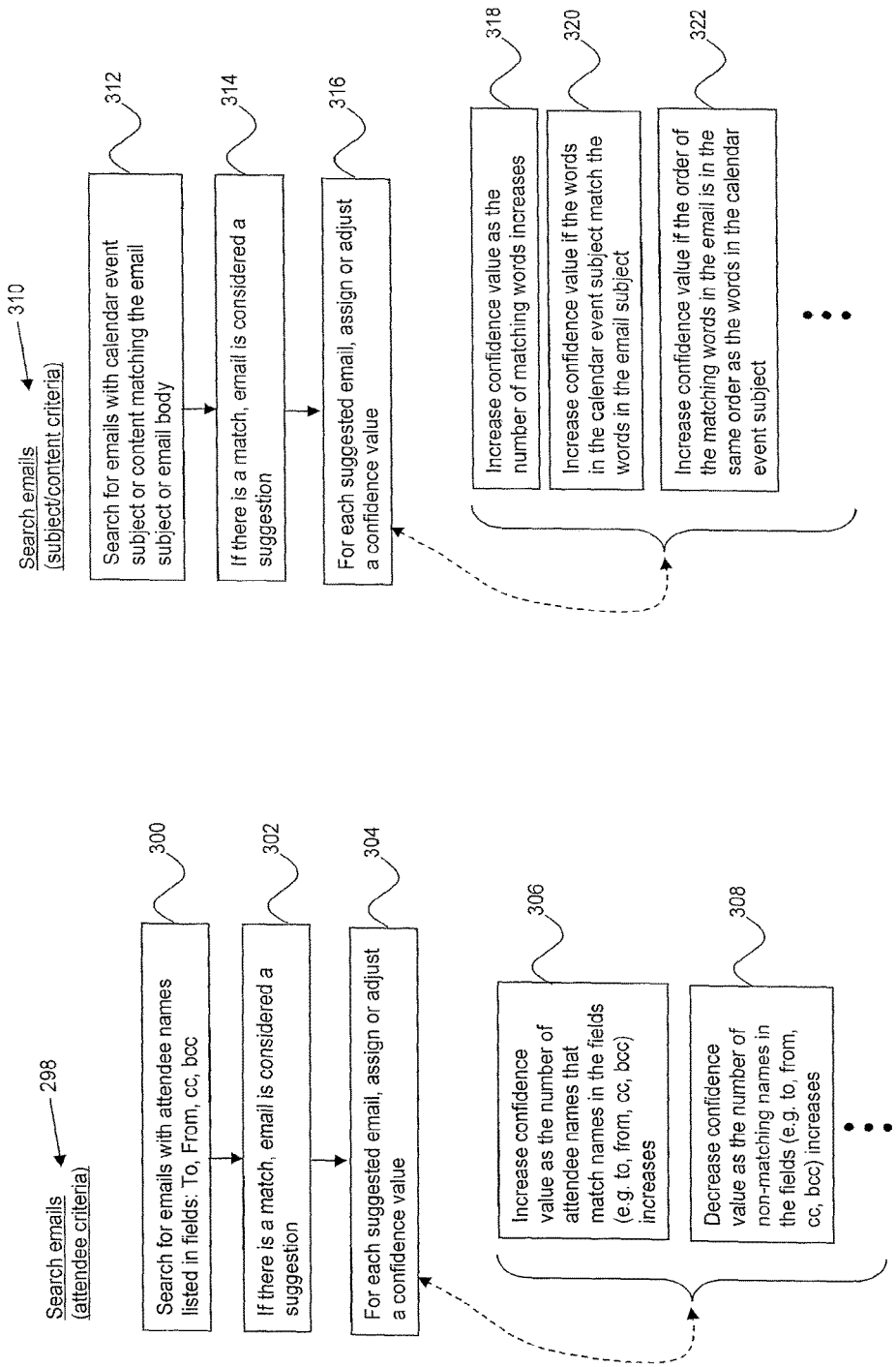

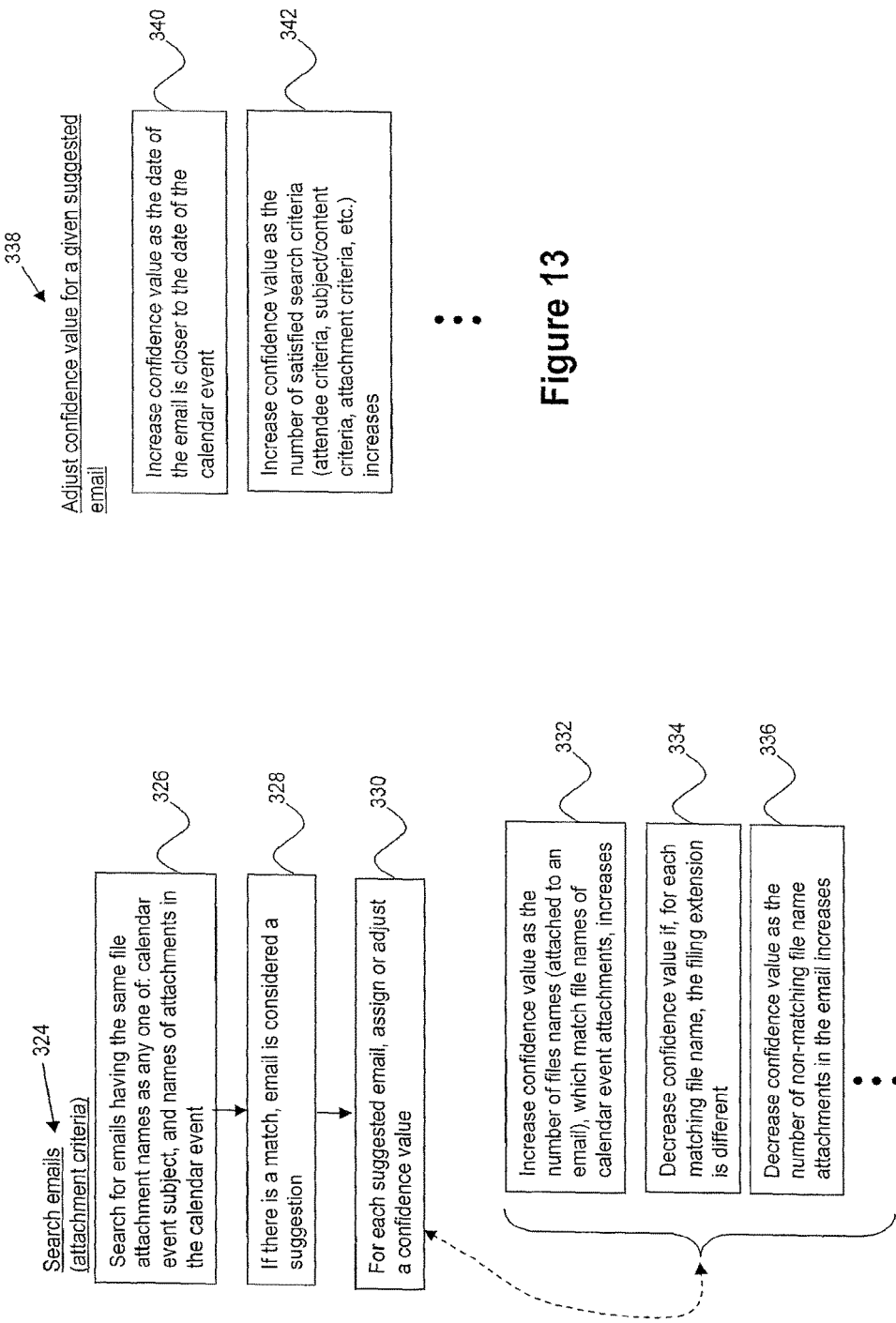

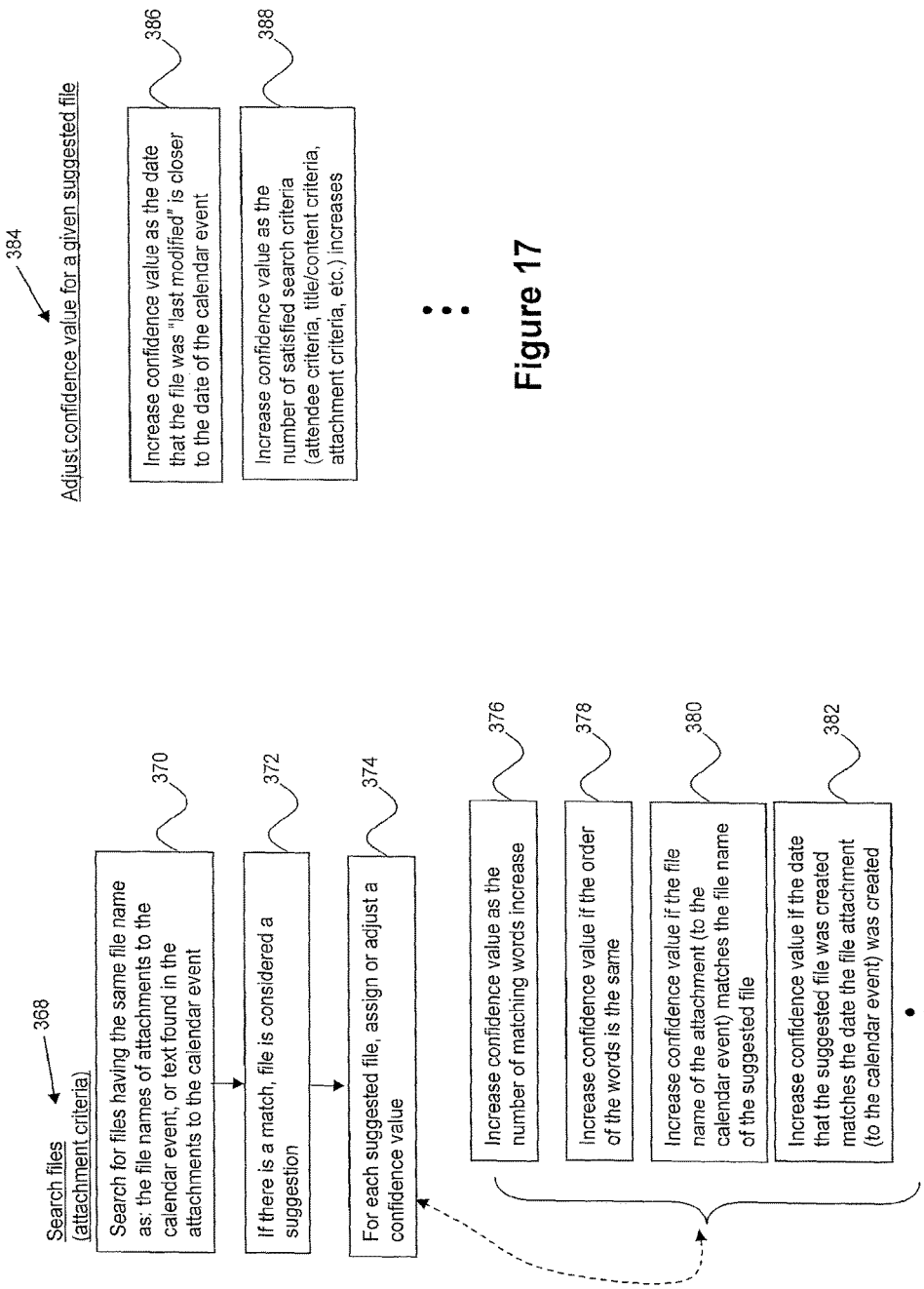

SYSTEMS AND METHODS FOR PROVIDING FILES IN RELATION TO A CALENDAR EVENT

The present application is a national entry of PCT Application No. PCT/CA2012/050268 filed on Apr. 27, 2012, incorporated herein by reference.

TECHNICAL FIELD

The following relates generally to providing files in relation to a calendar event.

DESCRIPTION OF THE RELATED ART

Calendar applications on electronic devices, such as mobile devices and computers, are used to schedule and organize appointments, events, meetings, and activities. A calendar application can send reminders to attendees before a calendar event begins. A user can also look back at past calendar events to determine events that occurred in the past. A calendar event includes, for example, a subject, attendees, a date and a time, and a location. Calendar events can also include attachments and a description of the event.

Furthermore, it is recognized that data in the world is being generated at an increasing rate. Understanding the relevancy and context of information becomes more difficult as the amount and the different types of data grow.

BRIEF DESCRIPTION OF THE DRAWINGS

Example embodiments will now be described by way of example only with reference to the appended drawings wherein:

FIG. 6 is a screen shot of an example embodiment graphical user interface (GUI) for a calendar event.

FIG. 7 is a screen shot of an example embodiment GUI for displaying suggested files, including emails, suggested to be relevant to the calendar event of FIG. 6.

FIG. 10 is a flow diagram of an example embodiment of computer executable or processor implemented instructions for searching for suggested emails in relation to a calendar event according to attendee criteria.

FIG. 11 is a flow diagram of an example embodiment of computer executable or processor implemented instructions for searching for suggested emails in relation to a calendar event according to subject or content, or both, criteria.

FIG. 12 is a flow diagram of an example embodiment of computer executable or processor implemented instructions for searching for suggested emails in relation to a calendar event according to attachment criteria.

FIG. 13 is an example embodiment of computer executable or processor implemented instructions for adjusting a confidence value for a given suggested email.

FIG. 16 is a flow diagram of an example embodiment of computer executable or processor implemented instructions for searching for suggested files in relation to a calendar event according to attachment criteria.

FIG. 17 is an example embodiment of computer executable or processor implemented instructions for adjusting a confidence value for a given suggested file.

DETAILED DESCRIPTION

Figure 1:
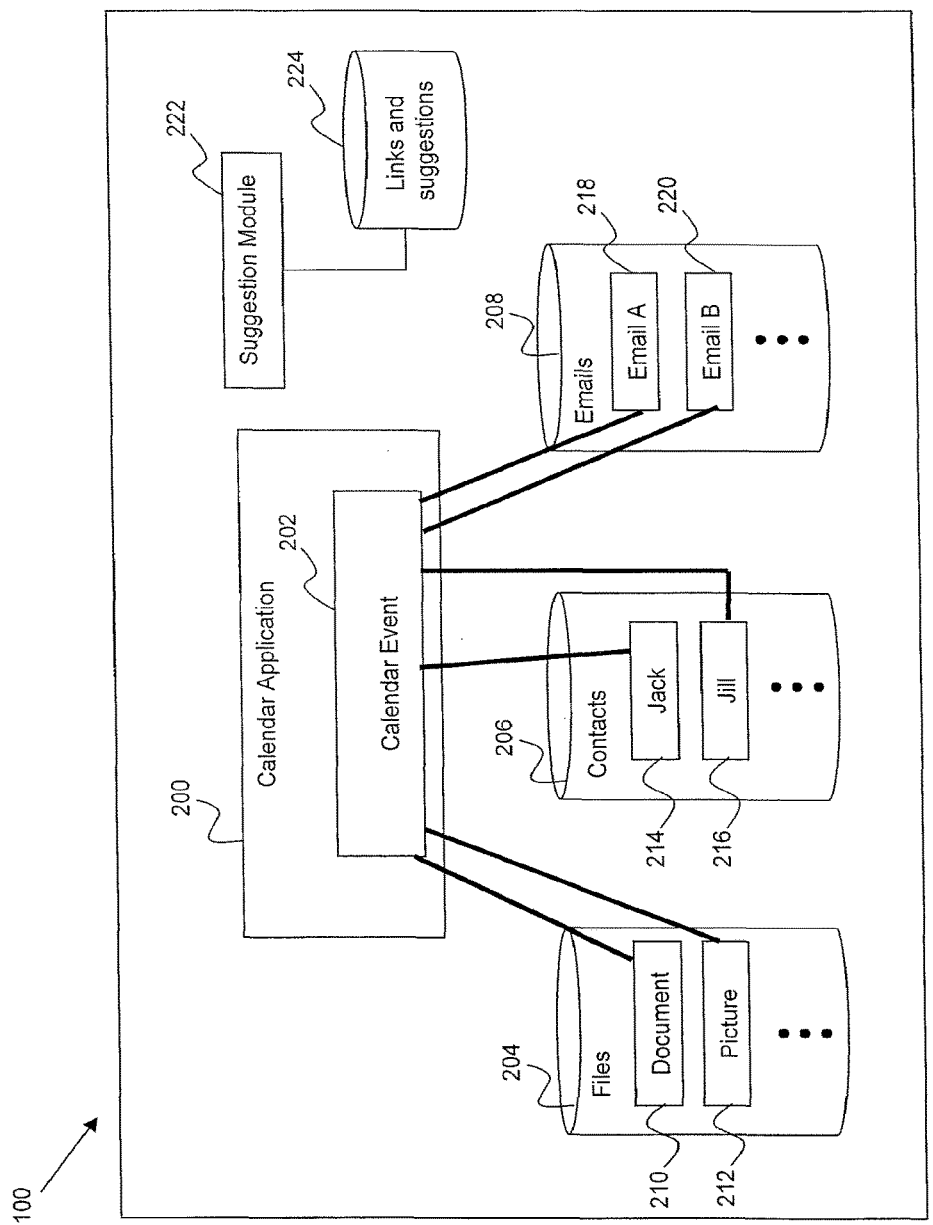
FIG. 1 is a block diagram of an example embodiment of an electronic device showing components for providing suggested files in relation to a calendar event.

It will be appreciated that for simplicity and clarity of illustration, where considered appropriate, reference numerals may be repeated among the example figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The use of calendar applications on electronic devices to schedule events, appointments, meetings, activities, etc. has become commonplace. The adoption of calendar applications has increased on mobile devices, as mobile devices have also become more common. Users can view their schedules on their mobile devices.

In many cases, emails are exchanged to prepare for a meeting. In an example embodiment, users can establish what topics should be discussed during a meeting, where a meeting should be held, who should attend, and on what date and time should the meeting occur. In an example embodiment, the emails include attachments. In relation to the emails, or as a result of the emails, a calendar event is created and sent to the invited attendees.

It is recognized that when a user views an upcoming calendar event, presently occurring calendar event, or past calendar event, a user may wish to view emails or files relevant to the calendar event. A user may search for the relevant emails and the files. This can involve opening an email application, or a file searching application, or both. The search may require the user to remember keywords and dates displayed in the calendar event, which the user will compare against when conducting a manual search. Such a method can be time consuming and difficult.

Systems and methods are described herein for suggesting and displaying files and emails in relation to a calendar event. This conveniently saves time and a number of steps for the user.

In an example embodiment, a user views a calendar event using a calendar application. The user provides an input to view files suggested to be relevant to the calendar event. A search is performed for files in relation to the calendar event and files suggested to be relevant are displayed on the electronic device. A user can select a suggested file for further viewing. For example, if the file is an email, selecting the suggested email will launch an email application to view the email. In another example embodiment, if the file is a text document, selecting the suggested text document will launch a document application to view the document. In this way, a user can conveniently retrieve and view suggested information in relation to the calendar event.

A "file" herein refers to a document, an email, a message, a picture, a song, a video, a media file, a reminder, a location, a task, a memo, a contact, a list, a tag, etc. It can be appreciated various types of data can be considered a file. An email is a type of file, and a contact is a type of file. Files (e.g. an email and a contact) are sometimes herein referred to by their specific file type.

Turning to FIG. 1, an example embodiment of an electronic device 100 is provided. It includes a calendar application 200. Within the calendar application is a calendar event 202. The electronic device 100 includes other applications and files. A files database 204 includes a document 210 and a picture 212. A contacts database 206 includes a contact for "Jack" 214 and a contact for "Jill" 216. An email database 208 includes email A 218 and email B 220.

A suggestion module 222 searches for files in relation to the calendar event 202. In an example embodiment, suggestion module 222 searches for files based on a number of parameters, including information in a calendar event (such as for example the subject of the calendar event or attendees of the calendar event) and synonyms of information in a calendar event.

All or at least part of the search results are suggested to be relevant to the calendar event 202. In other words, a link is formed between a suggested file and the calendar event 202. The links and suggestions are stored in a database 224.

In another example embodiment, suggestion module 222 searches the links and suggestions database 224 for existing links or relationships between files and the calendar event 202. The files linked to the calendar event 202 are then suggested to the user.

The links between the calendar event 202 and the other files (e.g. 210, 212, 214, 216, 218, 220) are illustrated by the thick connecting lines there between.

It can be appreciated that various electronic and computing devices can be used with the example embodiments described herein. Examples of such devices include pagers, tablets, cellular phones, cellular smart-phones, wireless organizers, personal digital assistants, mobile computers, laptops, handheld wireless communication devices, wirelessly enabled notebook computers, camera devices and the like. Such generally mobile devices will hereinafter be commonly referred to as "mobile devices". It will however be appreciated that the example embodiments described herein are also suitable for other electronic and computing devices that are generally not mobile, e.g. desktop computers and other "non-mobile" electronic and computing devices. The terms mobile devices, electronic devices and computing devices are herein used interchangeably.

In an example embodiment, the electronic device is a two-way communication device with advanced data communication capabilities including the capability to communicate with other electronic devices or computer systems through a network of transceiver stations. The electronic device may also have the capability to allow voice communication. Depending on the functionality provided by the electronic device, it may be referred to as a data messaging device, a two-way pager, a cellular telephone with data messaging capabilities, a wireless Internet appliance, or a data communication device (with or without telephony capabilities).

Figure 3:
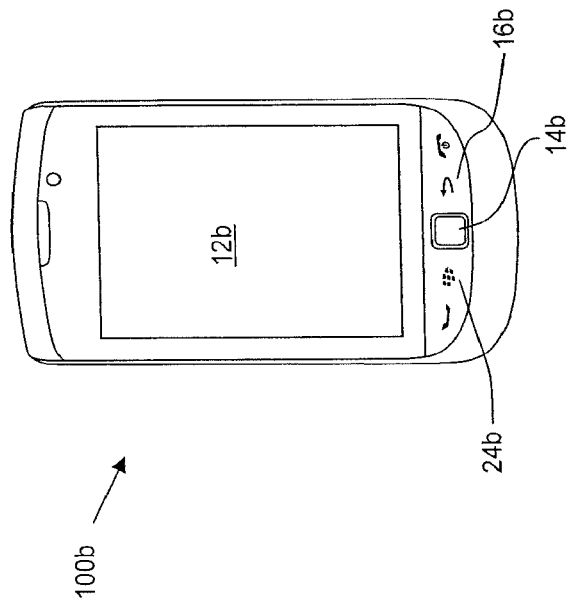
FIG. 3 is a plan view of another example embodiment electronic device.
Figure 2:
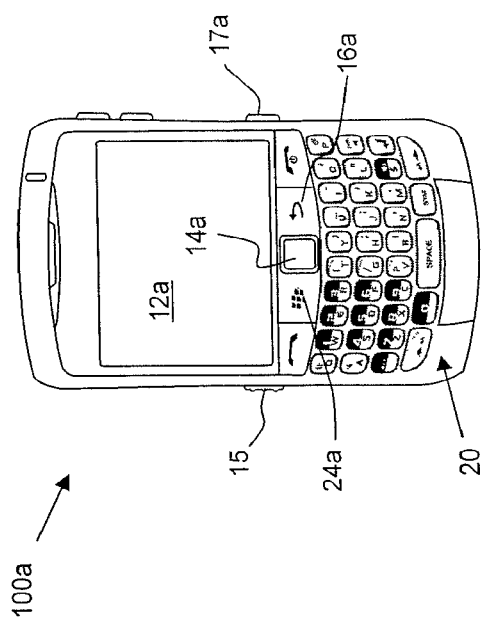
FIG. 2 is a plan view of an example embodiment electronic device.

Referring to FIGS. 2 and 3, an example embodiment of an electronic device 100a is shown in FIG. 2, and another example embodiment of an electronic device 100b is shown in FIG. 3. It will be appreciated that the numeral "100" will hereinafter refer to any electronic device 100, including the example embodiments 100a and 100b, those example embodiments enumerated above or otherwise. It will also be appreciated that a similar numbering convention may be used for other general features common between all Figures such as a display 12, a positioning device 14, a cancel or escape button 16, a camera button 17, and a menu or option button 24.

The electronic device 100a shown in FIG. 2 includes a display 12a and a cursor or view positioning device 14. In an example embodiment, the display 12a is touch-sensitive. Shown in this example embodiment is an optical track pad 14a. In another example embodiment, the positioning device 14 is a track ball (not shown). Positioning device 14 may serve as another input member and detects the displacement of a finger that is moving on top of it to provide selection inputs to the main processor 102 (see FIG. 5). It can also be pressed in a direction generally toward housing to provide another selection input to the processor 102. The optical track pad 14a permits multi-directional positioning of a selection cursor 18, such that the selection cursor 18 can be moved in an upward direction, in a downward direction and, if desired and/or permitted, in any diagonal direction. The optical track pad 14a is in this example situated on the front face of a housing for electronic device 100a as shown in FIG. 2 to enable a user to manoeuvre the optical track pad 14a while holding the electronic device 100a in one hand. The optical track pad 14a may serve as another input member (in addition to a directional or positioning member) to provide selection inputs to the processor 102 and can preferably be pressed in a direction towards the housing of the electronic device 100b to provide such a selection input.

The display 12 may include a selection cursor 18 that depicts generally where the next input or selection will be received. The selection cursor 18 may include a box, alteration of an icon or any combination of features that enable the user to identify the currently chosen icon or item. The electronic device 100a in FIG. 2 also includes a programmable convenience button 15 to activate a selected application such as, for example, a calendar or calculator. Further, electronic device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the electronic device housing, while the convenience button 15 and camera button 17a are disposed at the side of the housing. This button placement enables a user to operate these buttons while holding the electronic device 100 in one hand. The keyboard 20 is, in this example embodiment, a standard QWERTY keyboard.

Although not shown in the drawings, it can be appreciated that the devices shown in FIGS. 2 and 3 can have front facing cameras, such that when the user is looking at the display, the user's image is captured by the front-facing camera.

The electronic device 100b shown in FIG. 3 includes a touch sensitive display 12b and the positioning device 14b in this example embodiment is an optical track pad 14b. In another example embodiment, the positioning device 14b is a track ball (not shown). The electronic device 100b also includes a menu or option button 24b, and a cancel or escape button 16b. In an example embodiment, the electronic device 100b includes a "slide-out" QWERTY keyboard (not shown). In this example embodiment, the keyboard (not shown), positioning device 14b, escape button 16b and menu button 24b are disposed on a front face of a electronic device housing. The keyboard (not shown) slides out from a side of the electronic device 100b to reveal a standard QWERTY keyboard. In another example embodiment, the electronic device 100b does not include a physical keyboard, but can display a virtual keyboard on the display 12b.

It will be appreciated that for the electronic device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the electronic device 100 etc.), or other whether presently known or unknown may be employed. Similarly, any variation of keyboard 20, 22 may be used. It will also be appreciated that the electronic devices 100 shown in FIGS. 2 and 3 are for illustrative purposes only and various other electronic devices 100 are equally applicable to the following examples. Other buttons may also be disposed on the electronic device housing such as colour coded "Answer" and "Ignore" buttons to be used in telephonic communications. In another example, the display 12 itself is touch sensitive thus itself providing an input mechanism in addition to display capabilities.

Figure 4:
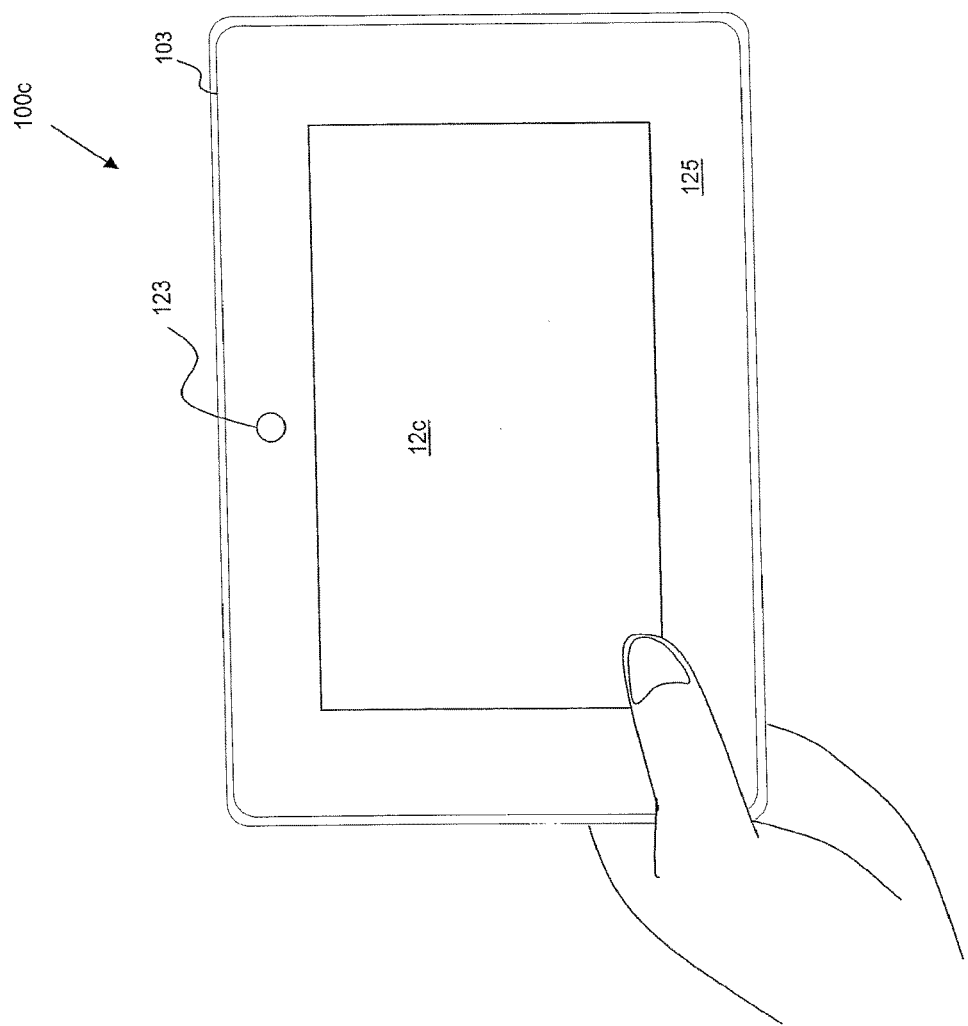
FIG. 4 is a plan view of another example embodiment electronic device.

The electronic device 100c shown in FIG. 4 includes a touch-sensitive display 103 and a front-facing camera 123. The touch-sensitive display 103 includes a touch-sensitive non-display area 125 surrounding a touch-sensitive display area 12c, both of which may be capable of receiving inputs in the form of touching. The front-facing camera 123 looks towards the user to capture images or videos of the user or scenes behind the user. Although not shown in FIG. 4, it can be appreciated that the electronic device 100c can include at least one physical button, knob, slider, or any other form of switch for receiving an input from a user. It can also be appreciated that the electronic device 100c includes other software components to enable a virtual keyboard application.

To aid the reader in understanding the structure of the electronic device 100, reference will now be made to FIG. 5.

Figure 5:
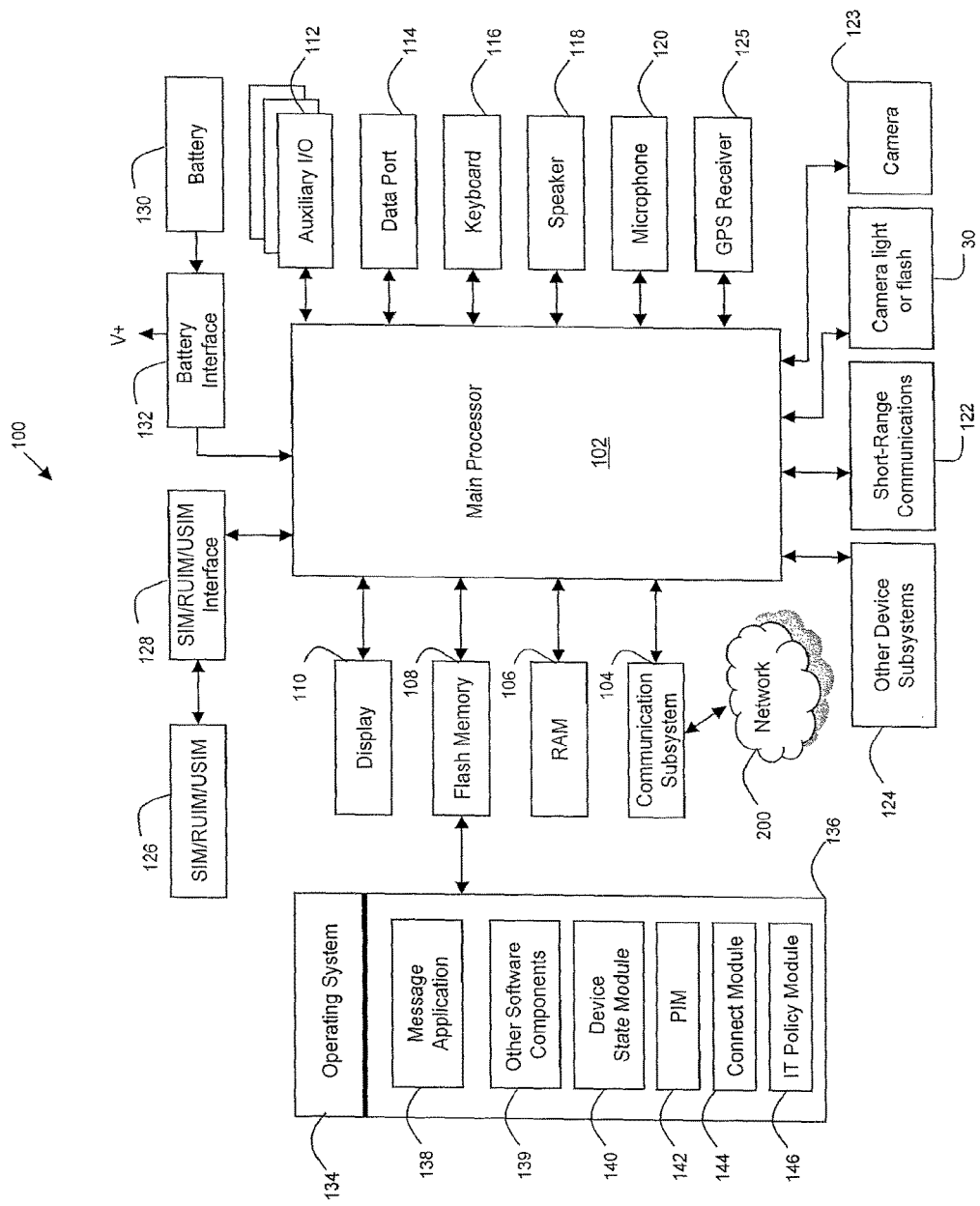
FIG. 5 is a block diagram of an example embodiment of a electronic device.

Referring to FIG. 5, shown therein is a block diagram of an example embodiment of an electronic device 100. The electronic device 100 includes a number of components such as a main processor 102 that controls the overall operation of the electronic device 100. Communication functions, including data and voice communications, are performed through a communication subsystem 104. The communication subsystem 104 receives messages from and sends messages to a wireless network 200. In this example embodiment of the electronic device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 125, short-range communications 122, a camera 123, a camera light or flash 30, and other device subsystems 124. The display 110 may be a touch-sensitive display.

Some of the subsystems of the electronic device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The electronic device 100 can send and receive communication signals over the wireless network 200 after required network registration or activation procedures have been completed. Network access is associated with a subscriber or user of the electronic device 100. To identify a subscriber, the electronic device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the electronic device 100 is not fully operational for communication with the wireless network 200. Once the SIM/RUIM/USIM 126 is inserted into the SIM/RUIM/USIM interface 128, it is coupled to the main processor 102.

The electronic device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the electronic device 100.

Although current technology makes use of a battery, future technologies such as micro fuel cells may provide the power to the electronic device 100.

The electronic device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the electronic device 100 during its manufacture. Software applications may include a message application 138, a device state module 140, a Personal Information Manager (PIM) 142, a connect module 144 and an IT policy module 146. A message application 138 can be any suitable software program that allows a user of the electronic device 100 to send and receive electronic messages, wherein messages are typically stored in the flash memory 108 of the electronic device 100. A device state module 140 provides persistence, i.e. the device state module 140 ensures that important device data is stored in persistent memory, such as the flash memory 108, so that the data is not lost when the electronic device 100 is turned off or loses power. A PIM 142 includes functionality for organizing and managing data items of interest to the user, such as, but not limited to, e-mail, contacts, calendar events, and voice mails, and may interact with the wireless network 200. A connect module 144 implements the communication protocols that are required for the electronic device 100 to communicate with the wireless infrastructure and any host system, such as an enterprise system, that the electronic device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the electronic device 100. These software applications 139 can be pre-installed applications (i.e. other than message application 138) or third party applications, which are added after the manufacture of the electronic device 100. Examples of third party applications include games, calculators, utilities, virtual keyboards, etc. The software applications 138 can also include a calendar application 200, a document application, an email application, a task application, and a linking application. A linking application can be used to link two files together.

The additional applications 139 can be loaded onto the electronic device 100 through at least one of the wireless network 200, the auxiliary I/O subsystem 112, the data port 114, the short-range communications subsystem 122, or any other suitable device subsystem 124.

The data port 114 can be any suitable port that enables data communication between the electronic device 100 and another computing device. The data port 114 can be a serial or a parallel port. In some instances, the data port 114 can be a USB port that includes data lines for data transfer and a supply line that can provide a charging current to charge the battery 130 of the electronic device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the electronic device 100, or accessible or connectable thereto. Any application or module herein described may be implemented using computer readable/executable instructions or operations that may be stored or otherwise held by such computer readable media.

Turning to FIG. 6, an example embodiment of a graphical user interface (GUI) 226 of a calendar event is shown. It includes a subject 228 of the calendar event. It also includes a viewing menu 230, which includes controls 232, 234, 236 for viewing different information in relation to the calendar event. In an example embodiment, the controls 232, 234, 236 are tabs, buttons, or other controls that control which information is displayed below. The controls include a details control 232, a people control 234, and an emails control 236. When the details control 232 is selected, information about the calendar event is displayed. When the people control 234 is selected, the names and information about the people attending or invited to the calendar event are shown. When the emails control 236 is selected, files including emails that are suggested to be relevant to the calendar event are displayed. In an example embodiment, the emails control 236 is named "Related files", "Extra", or "Files".

In FIG. 6, the details control 232 is selected. This is represented by the box 238 and the bold font of "Details". Accordingly, details about the calendar event are shown, including: date 240, time 242, organizer 244, location 246, and notes 248. The notes 248 includes additional information about the calendar event.

Although not shown, the details in the calendar event can show and include one or more attachments. For example, a PDF file, a presentation file (e.g. ".ppt"), or a Word document file (e.g. ".doc") can be attached to the calendar event.

An options menu or interface 251 is also provided. It includes a navigation button 250 for moving between different calendar events and different views of the calendar application. For example, selecting the button 250 can show a previously scheduled calendar event or a month view of a calendar. Other options include a "busy" button 252, an "accepted" button 254, an "edit" button 256, and a further options button 258.

When the busy button 252 is selected, a menu will appear providing options for the user to change the status of the meeting. Example options include: Busy, Free, Tentative or Out of Office.

When the accepted button 254 is selected, an option menu is provided that allows the user to change his meeting answer to: "Accepted" (e.g. to confirm attendance), "Tentative", or "Decline". In an example embodiment, only a participant can change his meeting answer. The organizer will not see this option.

Selecting the edit button 256 allows a user to edit information about the calendar event. Selecting the further options button 258 displays other options related to the calendar event.

After detecting a selection input 260 with respect to the emails control 236, a different set of information is shown, for example, in FIG. 7.

Turning to FIG. 7, a different GUI 262 is provided in which the emails control 236 is active, as represented by the box 264 and the bold font of "Emails". Below is a listing of emails 266, 268, 270 that are suggested to be relevant to the calendar event. These are suggestions, since from the user's perspective, they may or may not be relevant to the calendar event. Email entry 266 includes, for example, the name of the email sender, the title or subject of the email, and the date that the email was received. In an example embodiment, the date also includes the time the email was received.

There is also a listing of files 272, 274, 276, 278, 280 that are suggested to be relevant to the calendar event. Some of the files may be attachments to the emails suggested to be relevant to the calendar event. For example, file 272 is a presentation file from, or attached to the email 266. The information displayed about the file 272 includes an icon identifying the type of file (e.g. a presentation file), the name of the file (e.g. "Product Review.ppt"), the name of the email to which it is attached (e.g. "Planning for team"), and the date of the email. Files 274 and 276 are also attached to suggested emails 268 and 270, respectively, and show similar types of information as file 272. File 274 is a picture, and file 276 is a word document.

Other files can be suggested, which are not attachments to suggested emails. For example, files 278 and 280 are files stored within the electronic device 100, but are not attachments to suggested emails. The information displayed in association with the names of the files includes an icon specifying the file type and a date on which the file was last modified, or created.

When a user selects a suggested email or file, the relevant application is launched to enable the user to view the suggested email or file. For example, selecting a presentation file launches a presentation application. In another example, selecting an email file launches an email application.

Although not shown, the GUI shown in FIG. 7 may include controls that allow a user to attach a suggested file to the calendar event. For example, there may be a button or option associated with each suggested email or file, that when selected or activated, inserts or attaches the suggested file to the calendar event.

In an example embodiment, although not shown, the GUI includes controls to remove a suggested email or file from the displayed suggestion list. The file or email is not deleted from the device 100, but is no longer displayed. This allows files, which, for example, the user deems to be not relevant, to be removed from the suggestion list.

In an example embodiment, a GUI for displaying files suggested to be relevant to a calendar event is provided. A calendar event GUI 226 displays a viewing menu 230. The viewing menu includes an emails control 236 to view any files suggested to be relevant to the calendar event. After receiving a selection input 260 for the control to view the file, a suggested relevant files GUI 262 is displayed. The suggested relevant files GUI includes the viewing menu 230 and the file. The emails control 236 is configured to, after receiving the selection input, invoke a search for any file suggested to be relevant to the calendar event.

It can be appreciated that the suggested files and emails are determined or searched according to various algorithms, which are described below.

Files attached to emails can be extracted from the suggested emails and shown.

Figure 8:
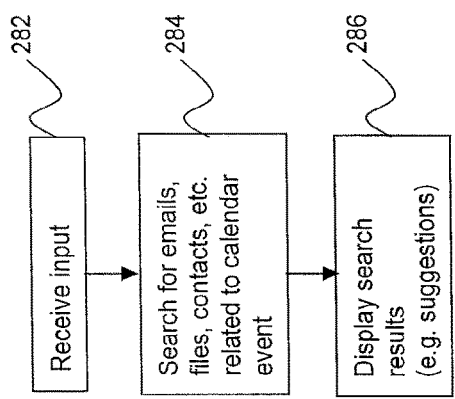
FIG. 8 is a flow diagram of an example embodiment of computer executable or processor implemented instructions for providing suggested files in relation to a calendar event.

Turning to FIG. 8, example computer executable and processor implemented instructions are provided for determining suggested emails and suggested files. In an example embodiment, these instructions can be implemented by the suggestion module 222.

At block 282, the electronic device receives an input that initiates the search for emails, files, contacts, etc. that are suggested to be relevant to a calendar event. At block 284, such a search is performed. At block 286, the search results are displayed. An example embodiment of such a display is shown in FIG. 7.

An example embodiment of such an input, as per block 282, is selecting the email controls tab 236. Another example embodiment of such an input is selecting and viewing a calendar event. For example, upon viewing a calendar event, a search can be initiated and the results, although not displayed, are stored. Therefore, when a user wishes to view the files suggested to be relevant, the search results can be quickly displayed.

Figure 9:
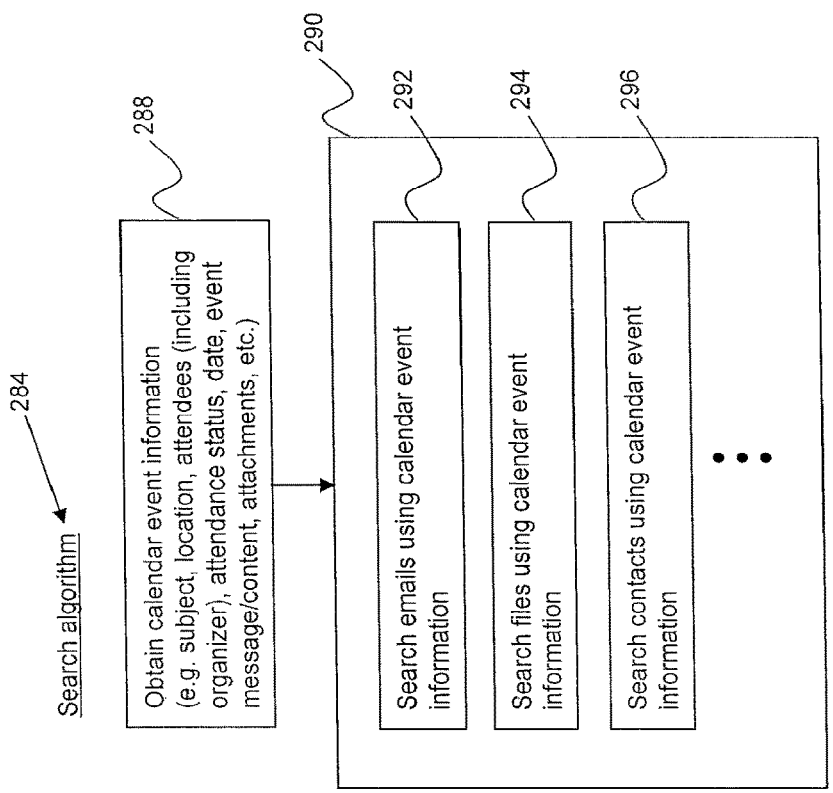
FIG. 9 is a flow diagram of an example embodiment of computer executable or processor implemented instructions for searching for suggested files in relation to a calendar event, according to an example operation in FIG. 8.

Turning to FIG. 9, an example embodiment of computer executable or processor implemented instructions for conducting a search are provided. The search algorithm or method 284 includes obtaining calendar event information (block 288). Examples of calendar event information include subject, location, attendees, attendance status of each attendee, date, event message or content, and attachments. The name of the event organizer can be included in the attendees. Examples of attendance status include "accepted", "tentative", "no", and "no response". This information is then used to perform a search according to block 290.

The search at block 290 can be conducted in various approaches. For example, a search for emails, using the calendar event information, is performed (block 292). A search for files, using the calendar event information, is performed (block 294). A search for contacts, using calendar event information, is performed (block 296). In example embodiments, the calendar event information itself may be searched. In other example embodiments, information similar to the calendar event information (such as synonyms of the calendar event information) may also be searched. Other searches can be performed. The searches can be performed in parallel or in series.

The search for emails, as per block 292, is discussed in detail with respect to attendee criteria 298 (see FIG. 10), subject or content criteria 310 (see FIG. 11), and attachment criteria 324 (see FIG. 12). Confidence values for determining how relevant an email is to the calendar event can be adjusted according to the method 338, as per FIG. 13. The confidence value adjustment method 338 occurs after computing the methods 298, 210, and 324. In an example embodiment, a confidence value can also be referred to as a confidence level. In an example embodiment, a confidence value is expressed as a percentage, or a value between 0 and 1.

Turning to FIG. 10, the search for emails according to attendee criteria is performed 298. At block 300, the electronic device 100 searches for emails with attendee names (from the calendar event) listed in the email fields "To", "From", "cc", and "bcc". (In an example embodiment, device 100 may also search for emails with names similar to the attendee names (e.g. synonyms of the attendee names) in the email fields. For example, if an attendee name is "Rob Smith", device 100 may also search for emails including "Robert Smith" in the email fields.) At block 302, if there is a match of one or more emails, then those one or more emails are considered suggestions. For each suggested email, a confidence values is assigned or adjusted. In an example embodiment, if a given suggested email does not already have a confidence value, then it is assigned a confidence value. In another example embodiment, if a suggested email has a confidence value, then the confidence value can be adjusted (block 304).

Example methods are provided for assigning or adjusting a confidence value in blocks 306, 308. For example, at block 306, a confidence value is increased as the number of attendee names that match names in the email fields increases. In other words, if five attendees are listed in the calendar event, then a suggested email that lists four of the five attendees will have a higher confidence value compared to a suggested email that lists two of the five attendees.

At block 308, a confidence value is decreased as the number of non-matching names in the fields increases. For example, the calendar event has five attendee names. A suggested email that lists the five attendee names on a mailing list that includes thirty recipients (e.g. twenty-five non-matching names) has a lower confidence value than a suggested email that lists the five attendee names on a mailing list that includes six recipients (e.g. one non-matching name).

Turning to FIG. 11, a search method 310 is described for subject and content criteria. At block 312, a electronic device 100 searches for emails with information in the subjects or body content of the emails matching information in the calendar event's subject or body content. (In an example embodiment, device 100 may also search for emails with information similar to information in the calendar event's subject or body content (e.g. synonyms of information in the calendar event's subject or body content). For example, if a calendar event's subject is "team meeting", device 100 may also search for emails including "group meeting".) For example, the calendar event subject can match text found in an email subject or email body. In another example embodiment, the calendar event text in the body can match text found in an email subject or email body. At block 314, if there is a match, then the email or emails are considered a suggestion. For each suggested email, a confidence value is assigned or adjusted (block 316).

Example methods for determining the confidence value are described with respect to blocks 318, 320, 322. At block 318, the confidence value is increased as the number of matching words increases. At block 320, the confidence value is increased if the words in the calendar event subject match the words in the email subject. In other words, the subject titles of a suggested email and a calendar event are the same, or near the same. At block 322, the confidence value is increased if the order of the matching words in the email is in the same order as the words in the calendar event.

Turning to FIG. 12, a search method for emails suggested to be relevant to the a calendar event is described according to attachment criteria 324. In other words, if an email has attachments, those attachments can be compared with calendar event information to conduct a search.

At block 326, the electronic device 100 searches for emails having a same file attachment name as information in the calendar event's subject and/or in a name of file attached to the calendar event. (In an example embodiment, device 100 may also search for emails having a file attachment name similar to information in the calendar event's subject and/or in a name of file attached to the calendar event (e.g. synonyms of information in the calendar event's subject and/or in a name of file attached to the calendar event).) For example, a calendar event can have the subject title "Team review" and have the attachment "Meeting minutes". If there is an email that has an attachment titled "Team review" or "Meeting minutes", then that email is considered a suggestion. In another example embodiment, if an email is titled "Meeting minutes", which matches the name of the attachment to the calendar event, then the email is considered a suggestion. In other words, if there is a match, the matched emails are considered suggestions (block 328). A confidence value is then adjusted or assigned (block 330) according to example methods 332, 334, 336.

In particular, as per block 332, a confidence value is increased as the number of file names (attached to an email) that match calendar event information increases. At per block 334, the confidence value decreases if, for each matching file name, the extension is different. For example, the calendar event attachment is "Meeting minutes.doc". An email that has an attachment titled "Meeting minutes.doc" will have a higher confidence value than an email that has an attachment "Meeting minutes.jpg". As per block 336, the confidence value is decreased as the number of non-matching file name attachments (to the email) increases.

In an example embodiment, the search described with respect to methods 298, 310, and 324 can be limited by time. For example, emails that are beyond a certain time period before or after the calendar event, or both, are not considered in the search. In an example embodiment, the time period is six months before or after a calendar event date. Therefore, an email dated seven months after the calendar event date will not be considered in the search.

Turning to FIG. 13, after the emails have been searched and one or more emails have been suggested to be relevant to the calendar event, the confidence values associated with each email can be adjusted according to computer executable or processor implemented operations 340 and 342. At block 340, the confidence value is increased as the date of the email is closer to the date of the calendar event. In an example embodiment, a suggested email that is dated four days prior to a calendar event has a higher confidence value compared to another suggested email dated seven days prior to the calendar event.

At block 342, the confidence value is increased as the number of satisfied search criteria increases. Search criteria include the attendee criteria 298, the subject or content criteria 310 and the attachment criteria 324. In other words, an email that is suggested based on all three criteria will have a higher confidence value compared to an email that is suggested based on a single criteria.

The confidence value associated with each suggested email can be used to order the search results. Emails with the highest confidence value will be displayed at the top of the list, and the other suggested emails will be displayed in descending order. In another example embodiment, only emails that have a confidence value above a suggested threshold value will be suggested.

In another example embodiment, confidence values are not used. For example, confidence values are not computed for each suggested email or file. For example, the suggested emails are displayed according to their dates. The most recent emails are shown at the top of a list, while older emails are displayed below.

The searching method for files 294 also includes multiple search criteria, including: title or content criteria 344 (see FIG. 14); attendee criteria 358 (see FIG. 15); and attachment criteria 368 (see FIG. 16). After the search is completed and files are suggested, the confidence value for a given suggested file can be adjusted according to the method 384 described in FIG. 17.

Figures 14, 15:
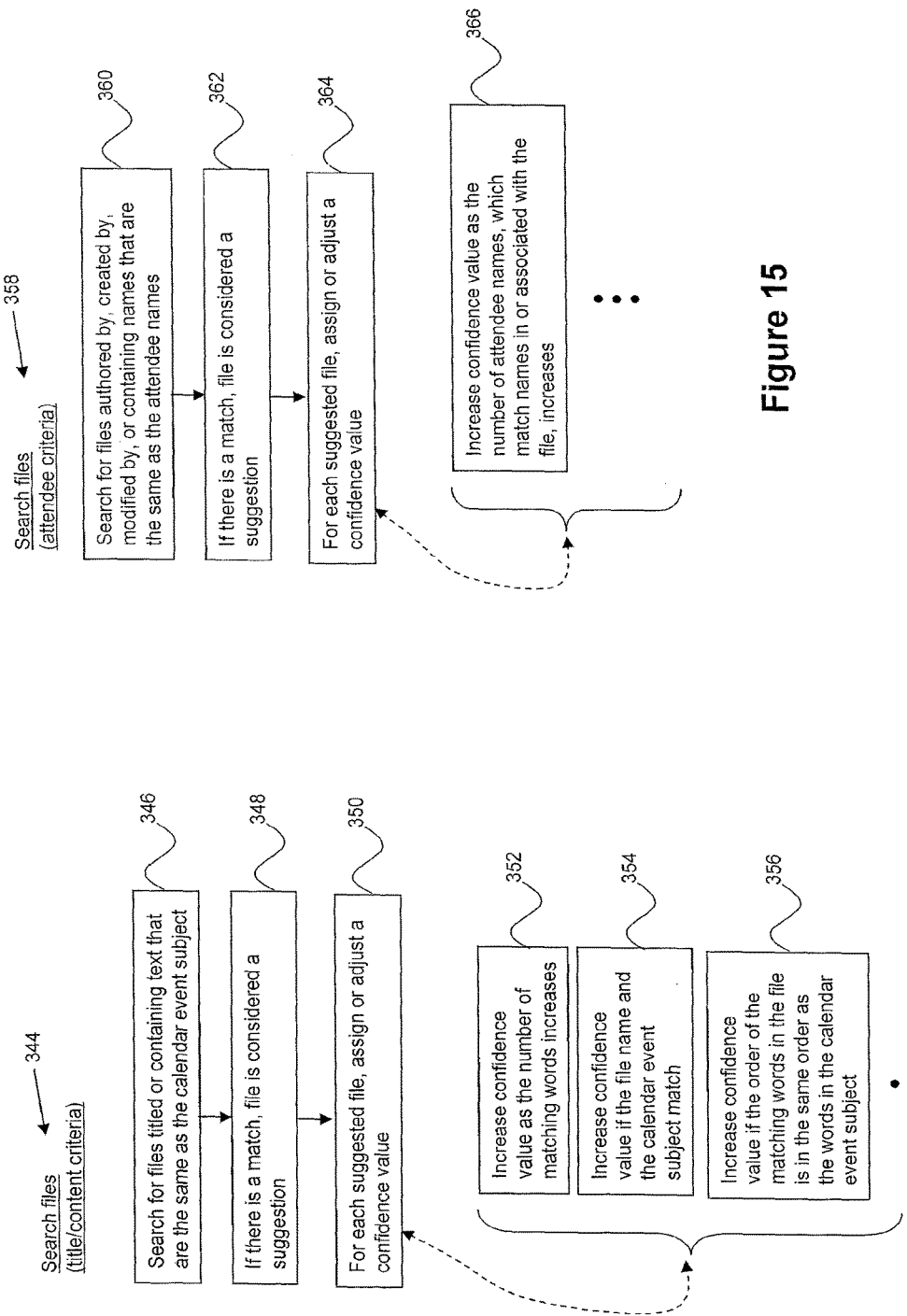
FIG. 14 is a flow diagram of an example embodiment of computer executable or processor implemented instructions for searching for suggested files in relation to a calendar event according to title or content, or both, criteria.
FIG. 15 is a flow diagram of an example embodiment of computer executable or processor implemented instructions for searching for files in relation to a calendar event according to attendee criteria.

Turning to FIG. 14, the electronic device 100 searches for files that have the same names or titles as the calendar event subject, and/or for files that contain content (e.g. text) that is the same as the calendar event subject (block 346). (In an example embodiment, device 100 may also search for files that have names similar to names or titles in the calendar event subject (e.g. synonyms of names or titles in the calendar event subject) and/or for files that contain content (e.g. text) similar to the calendar event subject (e.g. synonyms of content or text in the calendar event subject).) If a file is considered a match according to the search criteria, then the file is considered a suggestion (block 348). For each of the one or more suggested files, a confidence value is assigned or adjusted (block 350). Example operations for assigning or adjusting a confidence value are described in blocks 352, 354, and 356.

At block 352, the confidence value increases as the number of matching words increase. At block 354, the confidence value increases if the file name and calendar event's subject match. For example, a Word document that has the same name as the calendar event's subject has a higher confidence value compared to another Word document that has a different name, but contains therein text that is the same as the calendar event's subject. This considers situations in which a large document may refer to many topics, but is not mainly focused on the same topic as the calendar event. At block 356, the confidence value is increased if the order of the matching words in the file is in the same order as the words in the calendar event's subject.

Turning to FIG. 15, computer executable or processor implemented instructions for searching for files according to attendee criteria are provided 358. At block 360, the electronic device 100 searches for files that are authored by, created by, modified by, or that contain names that are the same as one or more of the attendee names. (In an example embodiment, device 100 may also search for files that are authored by, created by, modified by, or that contain names that are the similar to one or more of the attendee names (e.g. synonyms of one or more of the attendee names).) If there is a match according to any of such criteria, then the file is considered a suggestion (block 362). For each suggested file, a confidence value is assigned or adjusted (block 364).

For example, at block 366, the confidence value is increased as the number of attendee names, which match names associated in or associated with the suggested file, increases.

Turning to FIG. 16, computer executable or processor implemented instructions for searching for files according to attachment criteria are provided 368. At block 370, the electronic device 100 searches for files having the same file name as a file names of an attachment to the calendar event, and/or searches for files having the same file names as the text found in an attachment to the calendar event. (In an example embodiment, device 100 may also search for files having a file name similar to a file name of attachment to the calendar event (e.g. synonyms of file name of attachment to the calendar event) and/or search for files having a file name similar to text found in an attachment to the calendar event (e.g. synonyms of text found in an attachment to the calendar event).) For example, a calendar event has an attachment titled "Guidelines.doc" and includes the text "Step 1". If a file name title includes the text "Guidelines" or "Step 1", then the file is considered a suggestion. In other words, if a file is a match, then it is considered a suggestion (block 372). At block 374, for each suggested file, a confidence value is assigned or adjusted. Example operations for doing so includes blocks 376, 378, 380 and 382.

At block 376, the confidence value increases as the number of matching words increase. At block 378, the confidence value increases if the order of the words are the same. At block 380, the confidence value increases if the file name of the attachment (to the calendar event) matches the file name of the suggested file. For example, a suggested file having a name "Guidelines.doc", which matches the attachment file name "Guidelines.doc", has a higher confidence value than a suggested file having the name "Step 1", which matches text found within the attachment file. This is to place a higher confidence value on files that have likely the same topic focus as the attachment file.

At block 382, the confidence value is increased if the date that the suggested file was created matches the date the file attachment (to the calendar event) was created. In other words, if the suggested file and the attachment file have the same date, they may likely be more highly correlated, or even identical.

Turning to FIG. 17, after the search is completed, the confidence value for each of the suggested files can be adjusted according to the method 384. At block 386, the confidence value for a given suggested file is higher if the date that the file was "last modified" is closer to the date of the calendar event. At block 388, the confidence value of a given suggested file is increased as the number of satisfied search criteria increases. Search criteria includes the title or content criteria 344, the attendee criteria 358 and the attachment criteria 368.

In an example embodiment, a data link is formed between the calendar event and a given suggested file, email or contact. The links can be stored in the links and suggestions database 224.

Linking Framework

Systems and methods for a linking framework are described herein to provide context and relevancy of information. For example, the data stored on a user's electronic device or associated with the user's electronic device (e.g. data stored on a cloud server) can be used to generate a personal linking graph for the user. The personal linking graph associates different types of information using links. A general linking framework can be used to develop personal linking graphs for each user. In an example embodiment, the principles and methods associated with graph theory (e.g. a collection of nodes and edges) are used.

Figure 18:
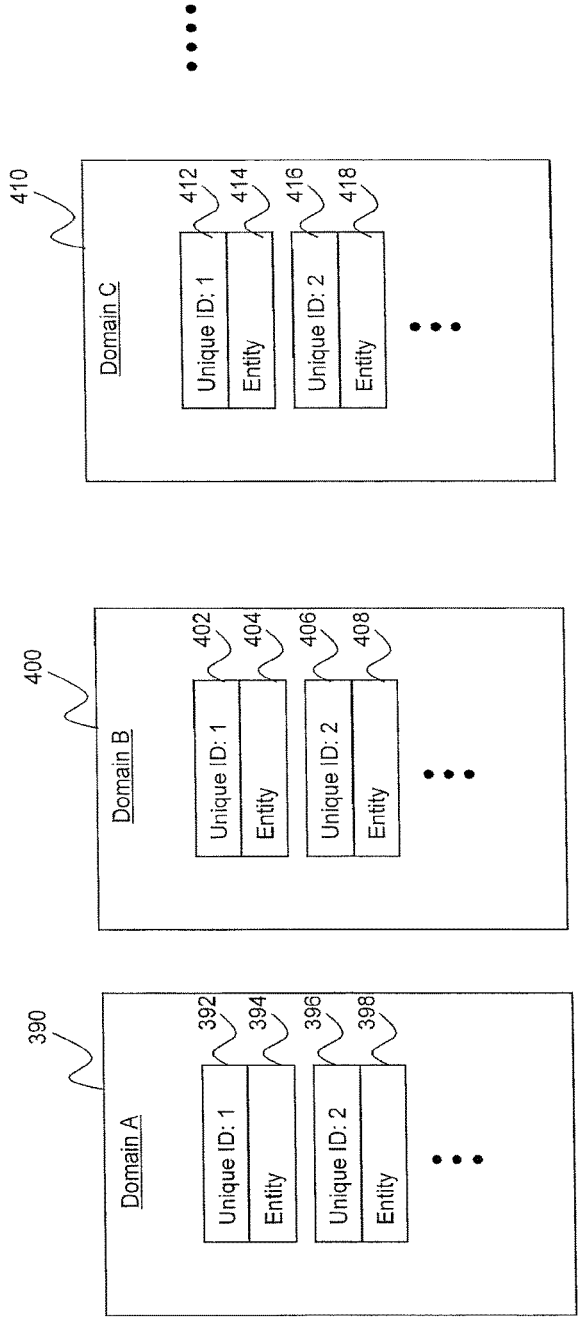
FIG. 18 is a block diagram of an example embodiment of data and applications organized, respectively, into entities and domains.

Turning to FIG. 18, several domains 390, 400 and 410 are shown. A domain is an area of data that has ownership over one or more data entities. Examples of domains are software applications. For example, a domain can be an email application, a calendar application, a contacts application, a tasks application, a memo application, or a tags application. Other domains may be used.

Within each domain is an entity. An entity is any data object that is within a domain. It is uniquely identifiable within that domain. For example, the entity has a unique identifier (also called "UID" or "unique ID").

The unique ID can be any string. In an example embodiment, all account and folder information is encoded in the string. In an example embodiment, generic identifiers, such as the account ID or the folder ID, or both, are encoded at the beginning of the string for indexing purposes. An account ID identifies a user's account. In this way, entire user accounts can be managed (e.g. searched, modified, deleted, etc.) according to the account ID encoded within the unique ID. In an example embodiment, the unique ID is only unique within a given domain.

Continuing with FIG. 18, in Domain A 390, the entity 394 has a unique ID of "1" (392), and the entity 398 has a unique ID of "2" (396). Similarly, in Domain B 400, the entity 404 has a unique ID of "1" (402), and the entity 408 has a unique ID of "2" (406). Similarly, in Domain C 410, the entity 414 has a unique ID of "1" (412), and the entity 418 has a unique ID of "2" (416).

In an example embodiment, the entities reside on the electronic device 100. In another example embodiment, some of the entities reside on the electronic device and others on servers in communication with the electronic device. In another example embodiment, the entities reside on servers in communication with the electronic device.

Another example of entities and domains is shown in FIG. 1. Referring back briefly to FIG. 1, the calendar event 202 is an entity in the domain of the calendar application 200. Similarly, the document 210 and the picture 212 are entities in the files domain 204. Likewise, the emails 218, 220 are entities within the emails domain 208. The contacts 214, 26 are entities within the contacts domain 206.

Other examples of entities include "Tweets" or messages, images, social network updates, lists, tasks, memos, reminders, tags, locations, and topics.

The linking framework includes links between at least two entities. A link represents a relationship between two entities. A link is defined by two entity references and a relationship type. An entity reference is defined by a domain of the entity and the unique ID of the entity. A relationship type specifies whether the relationship is a unidirectional relationship (e.g. "parent of", "child of") or a bidirectional relationship (e.g. "friend of"). Other relationship types can include symmetrical and non-symmetrical relationships. Other relationship types can also be used.

Figure 19:
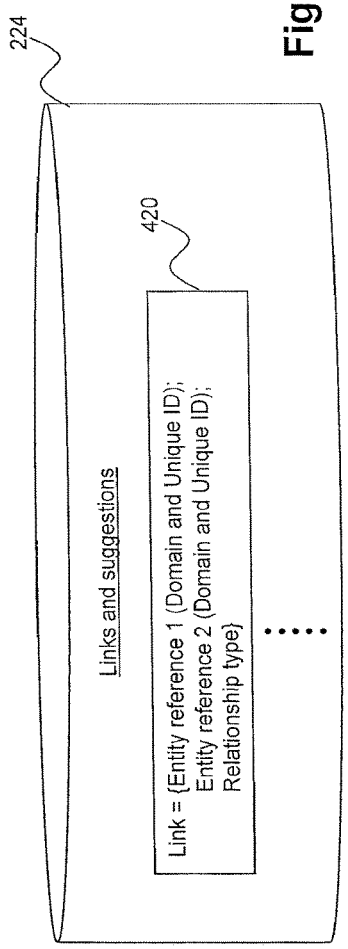
FIG. 19 is an example embodiment of a link stored in a links and suggestions database.

Turning to FIG. 19, an example link 420, which is stored in the links and suggestion database 224, is shown. The link includes: entity reference 1 (including a domain and a unique ID); entity reference 2 (including a domain and a unique ID); and a relationship type.

Figure 20:
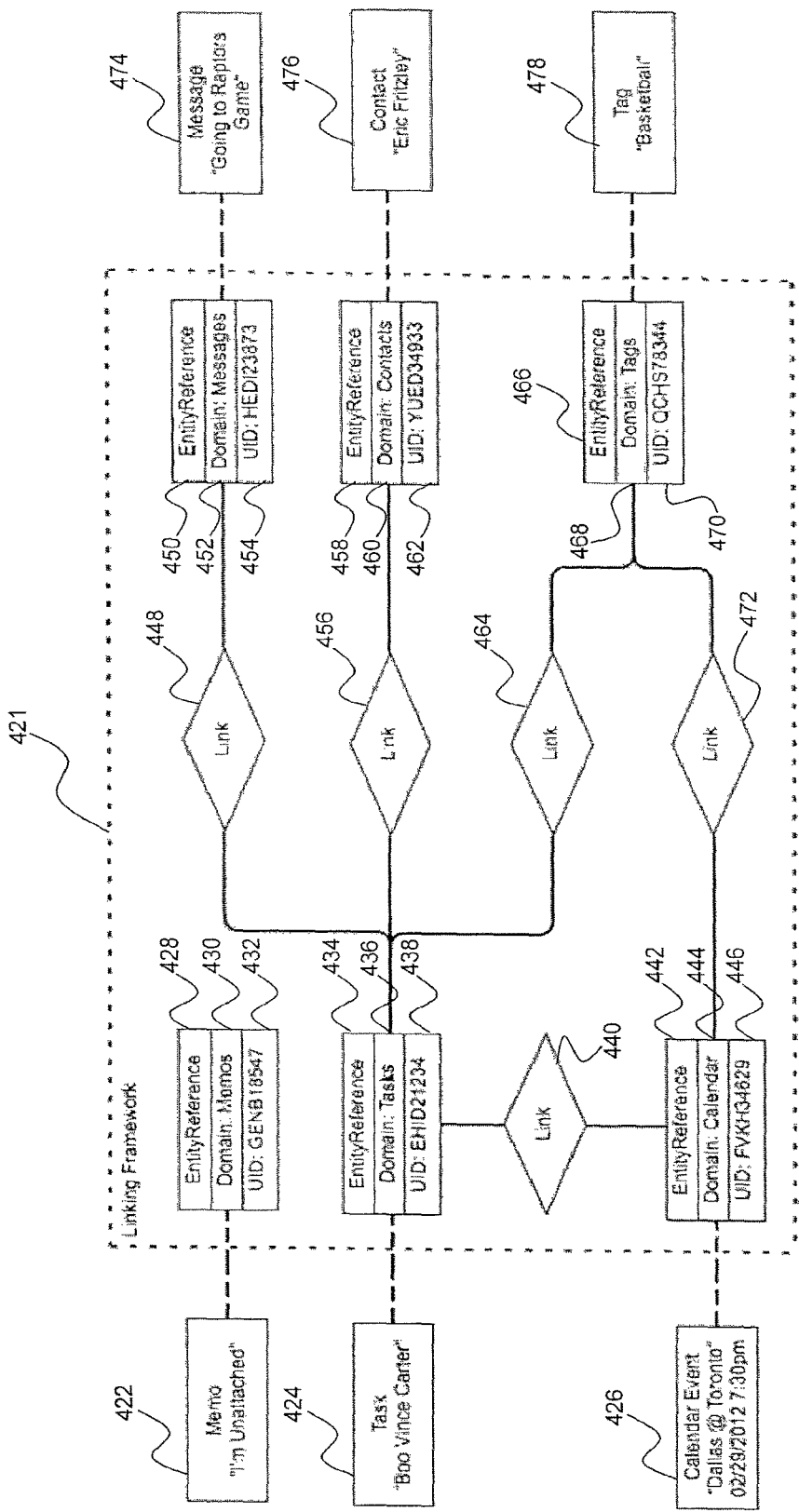
FIG. 20 is a block diagram of an example embodiment linking framework.

Turning to FIG. 20, an example embodiment of a personal linking graph 421 based on the linking framework is provided. The personal linking graph can be stored in the database 224. Several entities 422, 424, 426, 474, 476 and 478 are provided. A memo entity 422 has an entity reference 428, which includes the domain "memos" 430 and a unique ID 432. Entity 422 is not linked to the other entities.

The task entity 424 has an entity reference 434, which includes the domain "tasks" 436 and the unique ID 438. As shown by the link 440, the task entity 424 is linked to a calendar event entity 426. The link 440 links the task's entity reference 434 to the calendar event's entity reference 442, which includes the domain "calendar" 444 and a unique ID 446.

The task entity 424 is also linked to the message entity 474, the contact entity 476, and the tag entity 478, as shown by links 448, 456, and 464, respectively. The entity reference 434 is therefore linked to the message's entity reference 450, which includes the domain "messages" 452 and a unique ID 454. The entity reference 434 is also linked to the contact's entity reference 458, which includes the domain "contact" and a unique ID 462. The entity reference 434 is also linked to the tag's entity reference 466, which includes the domain "tags" and a unique ID 470.

The calendar event entity 426 and the tag entity 478 are also linked. As shown, the entity reference 442 has a link 472 with the entity reference 466.

Figure 21:
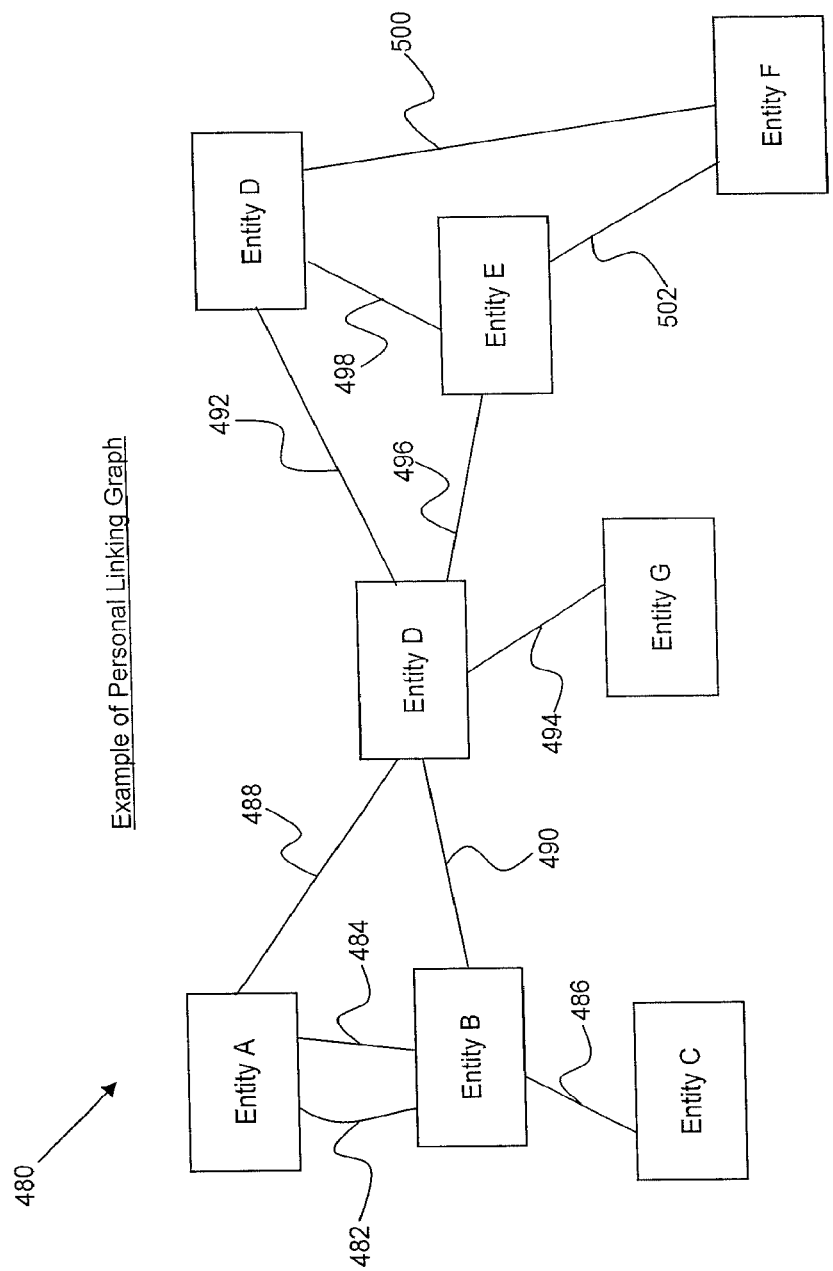
FIG. 21 is a block diagram of an example embodiment personal linking graph.

Turning to FIG. 21, an example embodiment of a personal linking graph 480 is shown. It is a simplified representation of the entities and the links. The entities are shown by the boxes, and the links are shown by the lines 482, 484, 486, 488, 490, 492, 494, 496, 498, 500, and 502.

The entities represent nodes and the links represent edges, such as provided according graph theory. In an example embodiment, when a search for related data is performed, a starting point can be Entity A. If a first-degree search is performed, based on links 482, 484, and 488, the search will show that Entity B and Entity D are linked to Entity A. If a second-degree search is performed, as per links 486, 494, 492, and 496, the search will show that Entity C, Entity G, Entity E and Entity H are related to Entity A. In other words, the "degree" shows how many edges (or links) an entity is removed from another entity. The degree can be used to determine how relevant or related one entity is to another entity. For example, a higher number degree between two entities means that there is a weaker relation compared to two entities that have smaller degree.

The number of links between two entities can also be used to determine how closely related data is. For example, Entity A and Entity B are associated by two links 482 and 484, which can be used to indicate that they are closely related, or related in more than one way.

Other principles related to graph theory can be applied to the linking framework. For example, searching can involve nearest neighbour algorithms. Furthermore, two different personal linking graphs can also be combined by merging two graphs. For example, two users may want to temporarily combine or merge their personal linking graphs.

Figure 22:
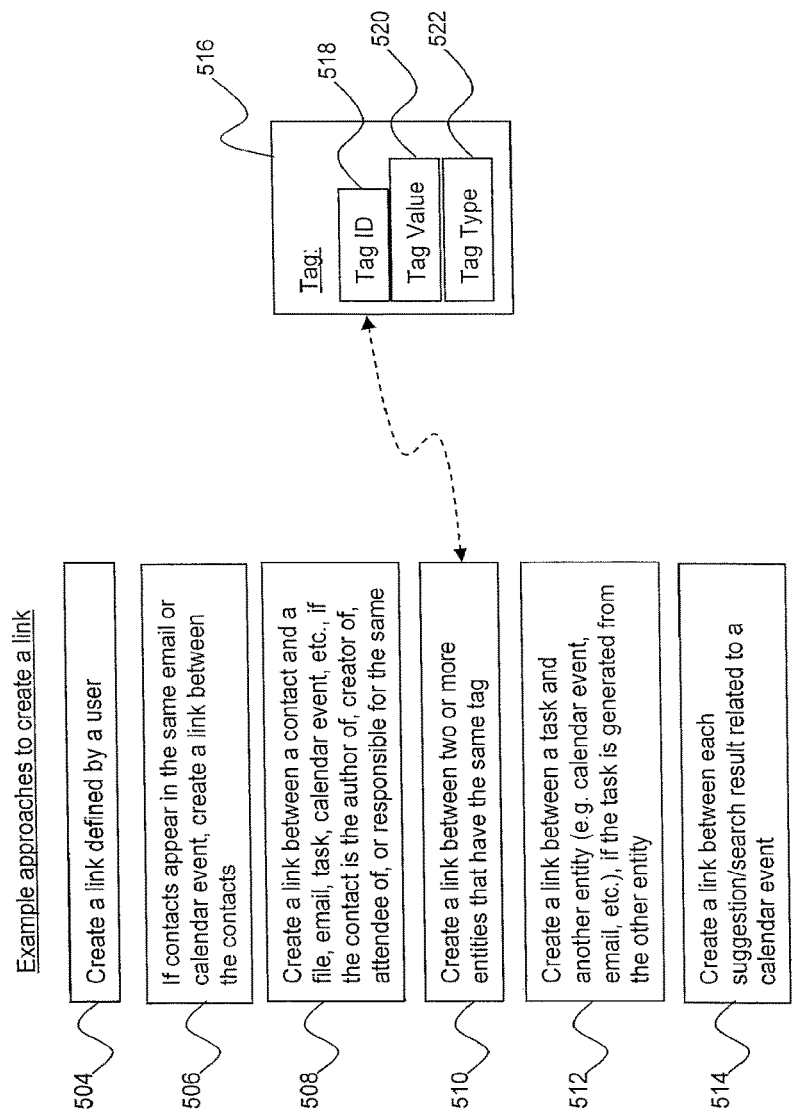
FIG. 22 is a listing of example embodiment operations to create a link.

Turning to FIG. 22, a number of example embodiments for creating a link are provided. in an example embodiment, a link can be defined manually by a user (block 504). In another example embodiment, if contacts appear in the same email or calendar event, a link is created between the contacts (block 506). In another example embodiment, a link is created between a contact and any one or more of a file, email, task, calendar event, etc., if the contact is the author of, creator of, attendee of, or listed responsible person of such entities (block 508). In yet another example embodiment, a link is created between two or more entities that have the same tag (block 510).

In an example embodiment, a user can tag two separate entities with the same tag to form a link. A tag can be implicitly and explicitly defined. An implicitly defined tag would be parsed out of text and would be denoted by a hash (#) symbol, such as #home. An explicitly defined tag could be created by selecting a Link button (not shown), then a tag category, and finally the desired tag. The user interface would automatically recognize the implicitly defined tag and add it to a listing of tags.

An example tag 516 includes a tag ID 518, a tag value 520 and a tag type 522. The tag ID is the primary key and is specific to a domain. The tag value can be a string. Examples include 'important', 'basketball', 'home', etc. Tag type refers to different categories or groupings of tags. For example, there may be a "project" type tag and a "user-defined" type tag.

In an example embodiment, a link is created between a task and another entity (e.g. calendar event, email, etc.), if the task is generated from the other entity (block 512).

In an example embodiment, a link is created between each suggestion or each search result related to a calendar event (block 514). In other words, the suggestions generated from the operation in block 284 of FIG. 8 can be used to generate links.

In an example embodiment, items that are listed on the same list are linked together.

The context and relationship information from the linking framework can be used in many applications.

In an example embodiment, when composing an email, a personal linking graph can be searched to provide related data (e.g. files, contacts, older emails, etc.). The suggested files and emails can be attached to the email being composed. The suggested contacts can be added to the email recipient list. Older emails can also be viewed to provide context for the presently composed email.

A personal linking graph can also be used to provide reminders based on location or contacts. In an example embodiment, a reminder (e.g. an entity) can be linked to a location (e.g. another entity). When the electronic device 100 detects that it is currently located at the location, then the reminder is provided. The location of the electronic device 100 can be obtained using GPS.

In another example embodiment, a reminder is linked to a contact. If a meeting invitation or email is received which has the contact listed as an attendee or a recipient/sender, respectively, then the reminder is displayed.

In an example embodiment, a graphical user interface (GUI) (not shown) is provided that can set-up such context based reminders. When a user selects a reminder button in the GUI, three choices are provided including, time, location and contact. After receiving a user selection for one of the reminder types, the reminder is created. If a "time" reminder is selected, then the user specifies a time. If a "location" reminder is specified, then the user specifies a location, and a link between the reminder and the location is formed. If a "contact" reminder is specified, then the user specifies a contact, and a link between the reminder and the contact is formed.

Figure 23:
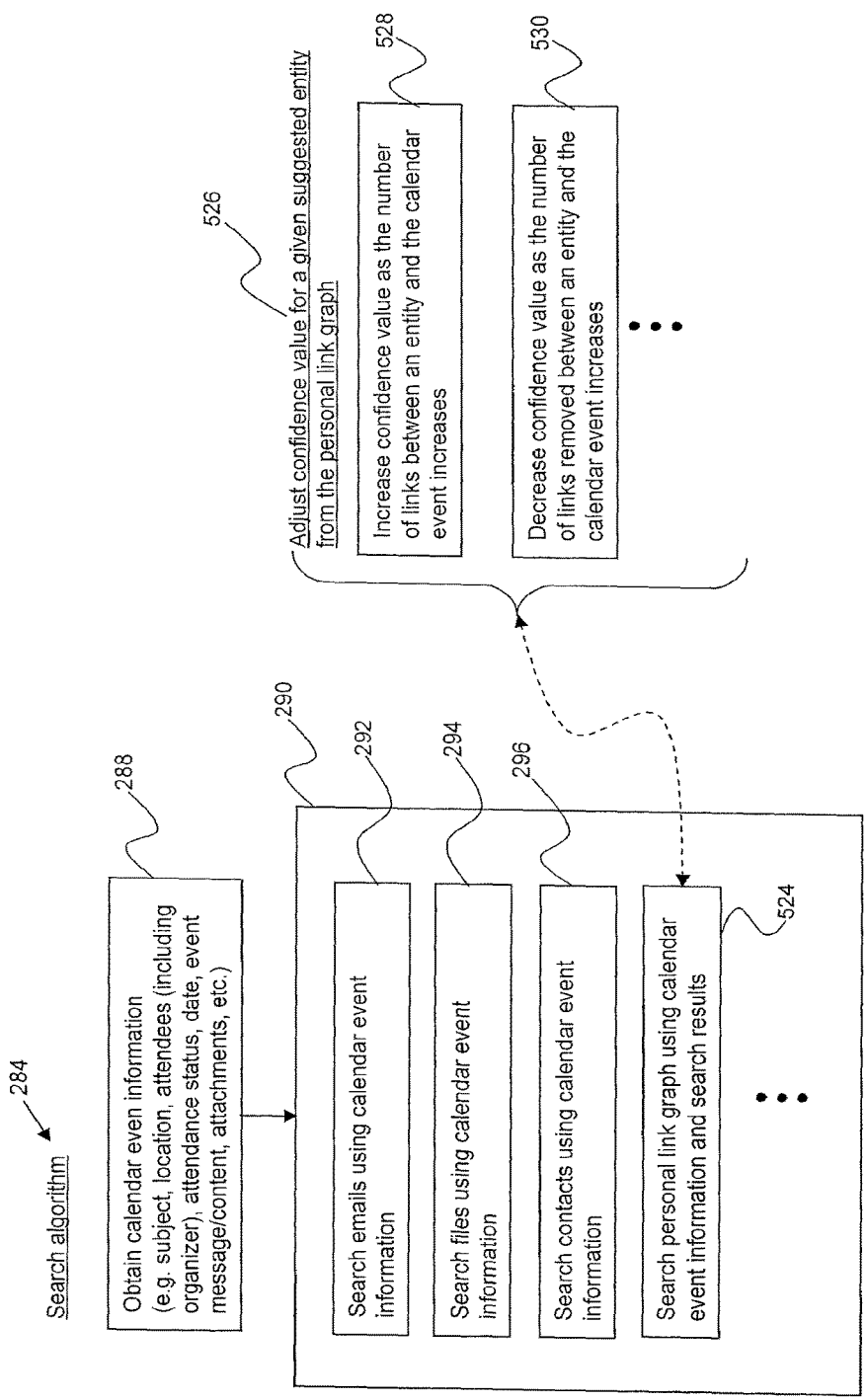
FIG. 23 is a flow diagram of an example embodiment of computer executable or processor implemented instructions for searching for suggested files in relation to a calendar event, according to an example operation in FIG. 8, but further including searching a personal linking graph.

Turning to FIG. 23, the search algorithm 284 (described earlier in relation to FIG. 8) is modified to account for the linking framework. The searching method 290 can include operation 524, which searches the personal linking graph using the calendar event information and the search results from blocks 292, 294 and 296. For example, based on the calendar event itself, the location, attendees, attachments, etc., a search can be performed in the linking framework. In other words, the calendar event is an entity, the location is an entity, the attendees (e.g. contacts) are entities, and the attachments are entities. These entities are starting points, or nodes, in the user's personal linking graph, from which a search can be conducted. Other entities that are linked to any of one or more of the calendar event, the location, the attendees (e.g. contacts), and the attachments, are considered search results and can be displayed as a suggestion to the user.

The search results from blocks 292, 294, and 296 include emails, files and contacts related to the calendar event. These suggested emails, files and contacts are entities that exist in the user's personal linking graph. Other entities that are linked to such entities (e.g. suggested emails, files and contacts) are also considered suggestions.

The confidence value for each suggested entity can be assigned or adjusted according to the method 526. It includes increasing the confidence value as the number of links between an entity and the calendar event increases (block 528). For example, a task may be linked to a calendar event through a number of ways. Examples include: the task can be generated from the calendar event; the task may have the same name as the calendar event; and the task and the calendar event have the same tag.

The confidence value for a given suggested entity is decreased as the number of links that separate an entity and the calendar event increases. In other words, the confidence value decreases as the degrees of separation increases. For example, a calendar event is linked to a document. The document is linked to a contact. The contact is linked to a picture. Therefore, the document will have a high confidence value; the contact will have a lower confidence value; and the picture will have an even lower confidence value.

In an example embodiment, the linking framework is used in combination with the method described in FIG. 8. The results of the search (blocks 292, 294, 296) are used to form links between the calendar event and other entities. This builds the user's personal linking graph. In other words, the results of the searches are inputs into the personal linking graph. In subsequent searches, the personal linking graph is incorporated into the search. The links are used to provide results for the search. In other words, the links are inputs into the search for suggesting files related to a calendar event.

In general, an example embodiment of a method is provided for providing suggested files related to a calendar event. It includes: receiving an input related to the calendar event; obtaining calendar event information; performing a search for a file related to the calendar event information; and displaying the file.

In an example embodiment, the file is any one of an email, a document, a pictures, a video, a task, a media file, and a presentation. In another example embodiment, the calendar event information includes one or more attendees, a subject, and an attachment. In another example embodiment, the calendar event information includes a date of the calendar event. In another example embodiment, the calendar event information includes one or more attendees, the file is an email, and the search includes searching for the email that has the one or more attendees listed as at least one of a sender and a recipient in the email. In another example embodiment, the method further includes, if the email is found, assigning a confidence value to the email based on a number of attendees that are listed as at least one of the sender and the recipient. In another example embodiment, the calendar event information includes an event subject, the file is an email, and the search includes searching for the email that has an email subject or email text that matches the event subject. In another example embodiment, the method further includes, if the email is found, assigning a confidence value to the email based on a number of matching words between the event subject and the email subject, or the email text. In another example embodiment, if the email is found, assigning a confidence value to the email based on an order of words in the email subject or the email text, compared to an order of words in the event subject. In another example embodiment, the calendar event information includes an event subject and an event attachment, the file is an email, and the search includes searching for the email includes an email attachment, wherein a name of the email attachment matches a name of the event attachment, or the name of the email attachment matches the event subject. In another example embodiment, if the email is found, assigning a confidence value to the email based on a file extension of the event attachment and a file extension of the email attachment. In another example embodiment, the search is for multiples files each related to the calendar event, and wherein a confidence value is assigned to each of the files that are related to the calendar event. In another example embodiment, the confidence value of a given suggested file is higher as a date associated with the given suggested file is closer to a date of the calendar event. In another example embodiment, the files are displayed in order according to their respective confidence values. In another example embodiment, the files that are displayed each have a respective confidence value above a threshold value. In another example embodiment, the method further includes: displaying a calendar event graphical user interface (GUI) including a control to display the file related to the calendar event, and wherein the input is a selection of the control; and, after receiving the input, displaying a related files GUI that includes the file. In another example embodiment, the method further includes establishing a link between the file and the calendar event. In another example embodiment, the link is stored in a links database. In another example embodiment, the link is defined by an entity reference for the calendar event, an entity reference for the file, and a relationship type, and wherein the entity reference for the calendar event includes a calendar domain and a unique ID of the calendar event, and the entity reference for the file includes a file domain and a unique ID of the file. In another example embodiment, performing the search for the file includes searching a links database, the links database including one or more links between the calendar event and the file.

An example embodiment method for creating a personal linking graph includes: providing a first entity and a second entity; generating a link between the first entity and the second entity, the link including a first entity reference, a second entity reference, and a relationship type; and, storing the link in a links database, the link forming at least part of the personal linking graph.

An example embodiment method for using a personal linking graph is provided includes: obtaining a first entity; searching a links database including one or more links between the first entity and other entities, the one or more links forming the personal linking graph; identifying a second entity associated with the first entity through the one or more links; and performing an action related to the second entity.

The steps or operations in the flow charts described herein are just for example. There may be many variations to these steps or operations without departing from the spirit of the invention or inventions. For instance, the steps may be performed in a differing order, or steps may be added, deleted, or modified.

The GUIs and screenshots described herein are just for example. There may be variations to the graphical elements and interactive elements without departing from the spirit of the invention or inventions. For example, such elements can be positioned in different places, or added, deleted, or modified.

It will be appreciated that the particular example embodiments shown in the figures and described above are for illustrative purposes only and many other variations can be used according to the example embodiments described. Although the above has been described with reference to certain specific example embodiments, various modifications thereof will be apparent to those skilled in the art as outlined in the appended claims.

The invention claimed is:

1. A method performed by an electronic device for providing files suggested to be relevant to a calendar event, comprising:

receiving an input related to the calendar event;

obtaining calendar event information;

performing a search for at least one file relevant to the calendar event using search criteria based on the calendar event information, where the calendar event information includes an event subject and an event attachment, the at least one file comprises an email, and the search includes searching for an email attachment, wherein a name of the email attachment corresponds to a name of the event attachment, or the name of the email attachment corresponds to the event subject, and wherein the search produces suggested files, each file in the suggested files comprising at least one field with a value satisfying the search criteria;

establishing a link between the each of the suggested files and the calendar event;

storing the link in a links database, wherein storing the link comprises storing the calendar event information as multiple entities linked to the calendar event and each of the suggested files;

computing a respective confidence level of each file in the suggested files, wherein the respective confidence level represents a likelihood that a given suggested file is relevant to the calendar event, wherein the computing comprises:

increasing the respective confidence level of the file for each value corresponding to the search criteria;

decreasing the respective confidence level of the given suggested file for each value not corresponding to the search criteria; and adjusting the respective confidence level based on a correspondence between a file extension of the event attachment and a file extension of the email attachment;

assigning the respective confidence level to each file in the suggested files;

modifying the search to include searching the links database for entities linked to the calendar event and the suggested files;

adjusting the respective confidence level assigned to each suggested file by:

increasing the respective confidence level as a number of links between the suggested file and the calendar event increases; and decreasing the respective confidence level as a degree of separation between the suggested file and the calendar event increases, wherein the degree of separation is proportional to a number of links to other entities that are separating the suggested file and the calendar event increases;

ordering the suggested files within the search results according to their respective confidence level to produce ordered search results;

displaying the ordered search results;

receiving a selection of a selected email or file within the ordered search results; and launching, based on receiving the selection of the selected email or file, a relevant application to view the selected email or file.

2. The method of claim 1 wherein the at least one file further comprises any one of an email, a document, a picture, a video, a task, a media file, or a presentation.

3. The method of claim 1 wherein the calendar event information includes one or more attendees, a subject, and an attachment, and wherein the search criteria comprises the one or more of the attendees or the subject.

4. The method of claim 1 wherein the email comprises an email date, wherein the calendar event information includes a date of the calendar event, and wherein computing the respective confidence level further comprises increasing the confidence level as the date of the email is closer in time to the date of the calendar event.

5. The method of claim 1 wherein the respective confidence level of the given suggested file is higher as a date associated with the given suggested file is closer in time to a date of the calendar event.

6. The method of claim 1 wherein displaying the ordered search results comprises displaying the suggested files that have a respective confidence level above a threshold value.

7. The method of claim 1 further comprising:
displaying a calendar event graphical user interface (GUI) including a control to display the at least one file suggested to be relevant to the calendar event, and wherein the input is a selection of the control; and,
after receiving the input, displaying a suggested relevant files GUI that includes the at least one file.

8. The method of claim 1 wherein the link is defined by an entity reference for the calendar event, an entity reference for the file, and a relationship type, and wherein the entity reference for the calendar event includes a calendar domain and a unique ID of the calendar event, and the entity reference for the file includes a file domain and a unique ID of the file.

9. The method of claim 1 wherein the calendar event information includes one or more attendees, and the search includes searching for the email that has the one or more attendees listed as at least one of a sender or a recipient in the email.

10. The method of claim 9 wherein computing the respective confidence level for the email comprises increasing the respective confidence level based on a number of attendees that are listed as at least one of the sender or the recipient and decreasing the respective confidence level for each sender and each recipient that is not in the one or more attendees.

11. The method of claim 1 wherein the calendar event information includes an event subject, and the search includes searching for the email that has an email subject or email text that corresponds to the event subject.

12. The method of claim 11 wherein computing the respective confidence level for the email comprises adjusting the respective confidence level based on a number of corresponding words between the event subject and the email subject, or the email text.

13. The method of claim 11 wherein computing the respective confidence level for the email comprises adjusting the respective confidence level based on a correspondence between an order of words in the email subject or the email text, compared to an order of words in the event subject.

14. A graphical user interface (GUI) for displaying files suggested to be relevant to a calendar event, the graphical user interface (GUI) comprising a processor configured to:
display a calendar event GUI displaying a viewing menu, the viewing menu including a control to view files suggested to be relevant to the calendar event;
wherein, after receiving a selection input for the control to view the files, a suggested relevant files GUI is displayed, the suggested relevant files GUI including the viewing menu and the files;
wherein the processor is further configured to, after receiving the selection input:
invoke a search for suggested relevant files using search criteria based on calendar event information, where the calendar event information includes an event subject and an event attachment, the files comprise an e-mail, and the search includes searching for an email attachment, wherein a name of the email attachment corresponds to a name of the event attachment, or the name of the email attachment corresponds to the event subject;
receive search results comprising the suggested relevant files, each suggested relevant file in the suggested relevant files comprising at least one field with a value satisfying the search criteria;
establish a link between the each of the suggested relevant files and the calendar event;
store the link in a links database, wherein storing the link comprises storing the calendar event information as multiple entities linked to the calendar event and each of the suggested relevant files;
compute a respective confidence level to each suggested relevant file in the suggested relevant files, wherein each respective confidence level represents a likelihood that a given suggested relevant file is relevant to the calendar event, wherein the processor is configured to compute by at least:
increasing the respective confidence level of the given suggested relevant file for each value corresponding to the search criteria;
decreasing the respective confidence level of the given suggested relevant file for each value not corresponding to the search criteria; and
adjusting the respective confidence level based on a correspondence between a file extension of the event attachment and a file extension of the email attachment;
assign the respective confidence level to each suggested relevant file in the suggested relevant files;
modify the search to include searching the links database for entities linked to the calendar event and the suggested relevant files;
adjust the respective confidence level assigned to each suggested file by:
increasing the respective confidence level as a number of links between the suggested relevant file and the calendar event increases; and
decreasing the respective confidence level as a degree of separation between the suggested relevant file and the calendar event increases, wherein the degree of separation is proportional to a number of links to other entities that are separating the suggested file and the calendar event increases;
order the suggested relevant files within the search results according to their respective confidence level to produce an ordered search results;
display the ordered search results in the suggested relevant files GUI;
receive a selection of a selected email or file within the ordered search results; and launch, based on receiving the selection of the selected email or file, a relevant application to view the selected email or file.

15. An electronic device configured to provide files suggested to be relevant to a calendar event, the electronic device having a processor configured to receive an input related to the calendar event;

obtain calendar event information;

perform a search for suggested files comprising at least one file relevant to the calendar event using search criteria based on the calendar event information, where the calendar event information includes an event subject and an event attachment, the at least one file comprises an e-mail, and the search includes searching for an email attachment, wherein a name of the email attachment corresponds to a name of the event attachment, or the name of the email attachment corresponds to the event subject, and wherein the search produces suggested files, each file in the suggested files comprising at least one field with a value satisfying the search criteria;

establish a link between the each of the suggested files and the calendar event;

store the link in a links database, wherein storing the link comprises storing the calendar event information as multiple entities linked to the calendar event and each of the suggested files;

compute a respective confidence level to each file in the suggested files, wherein each respective confidence level represents a likelihood that a given suggested file is relevant to the calendar event, wherein the processor is configured to compute by at least:

increasing the respective confidence level of the given suggested file for each value corresponding to the search criteria;

decreasing the respective confidence level of the given suggested file for each value not corresponding to the search criteria; and adjusting the respective confidence level based on a correspondence between a file extension of the event attachment and a file extension of the email attachment;

assign the respective confidence level to each file in the suggested files;

modify the search to include searching the links database for entities linked to the calendar event and the suggested files;

adjust the respective confidence level assigned to each suggested file by:

increasing the respective confidence level as a number of links between the suggested file and the calendar event increases; and decreasing the respective confidence level as a degree of separation between the suggested file and the calendar event increases, wherein the degree of separation is proportional to a number of links to other entities that are separating the suggested file and the calendar event increases;

order the suggested files within the search results according to their respective confidence level to produce ordered search results;

display the ordered search results;

receive a selection of a selected email or file within the ordered search results; and launch, based on receipt of the selection of the selected email or file, a relevant application to view the selected email or file.

* * * * *